US012555226B2

(12) United States Patent
Li

(10) Patent No.: US 12,555,226 B2
(45) Date of Patent: Feb. 17, 2026

(54) SPATIAL FEATURE ANALYSIS FOR DIGITAL PATHOLOGY IMAGES

(71) Applicant: Genentech, Inc., South San Francisco, CA (US)

(72) Inventor: Xiao Li, Foster City, CA (US)

(73) Assignee: GENENTECH, INC., South San Francisco, CA (US)

(*) Notice: Subject to any disclaimer, the term of this patent is extended or adjusted under 35 U.S.C. 154(b) by 575 days.

(21) Appl. No.: 17/987,647

(22) Filed: Nov. 15, 2022

(65) Prior Publication Data
US 2023/0140977 A1 May 11, 2023

Related U.S. Application Data

(63) Continuation of application No. PCT/US2021/032816, filed on May 17, 2021.
(Continued)

(51) Int. Cl.
G06K 9/00 (2022.01)
G06T 7/00 (2017.01)
(Continued)

(52) U.S. Cl.
CPC .......... *G06T 7/0012* (2013.01); *G06V 20/698* (2022.01); *G16H 50/20* (2018.01);
(Continued)

(58) Field of Classification Search
None
See application file for complete search history.

(56) References Cited

U.S. PATENT DOCUMENTS 9,865,053 B1 1/2018 Black et al.
2012/0260526 A1 10/2012 Smith et al.
(Continued)

FOREIGN PATENT DOCUMENTS

WO 2016083791 A1 6/2016
WO 2017053692 A1 3/2017
(Continued)

OTHER PUBLICATIONS

Shaban et al., "A novel digital score for abundance of tumour infiltrating lymphocytes predicts disease free survival in oral squamous cell carcinoma" (Year: 2019).*
(Continued)

*Primary Examiner* — SJ Park
(74) *Attorney, Agent, or Firm* — MORRISON & FOERSTER LLP

(57) ABSTRACT

Systems and methods relate to processing digital pathology images. More specifically, depictions of objects of a first class (e.g., lymphocytes) and depictions of objects of a second class (e.g., tumor cells) are detected. Locations of each biological object depiction are identified, which are used to generate multiple spatial-distribution metrics that characterize where depictions of objects of a first class are located relative to objects of a second class. The spatial-distribution metrics are used to generate a result corresponding to a predicted biological state of or a potential treatment of a subject. For example, the result may predict whether and/or an extent to which lymphocytes have infiltrated a tumor, whether checkpoint blockade therapy would be an effective treatment for the subject, and/or whether a subject is eligible for a clinical trial.

19 Claims, 14 Drawing Sheets

Related U.S. Application Data

(60) Provisional application No. 63/077,232, filed on Sep. 11, 2020, provisional application No. 63/026,545, filed on May 18, 2020.

(51) Int. Cl.
    *G06V 20/69*     (2022.01)
    *G16H 50/20*     (2018.01)

(52) U.S. Cl.
    CPC ............... *G06T 2207/10024* (2013.01); *G06T 2207/10056* (2013.01); *G06T 2207/30024* (2013.01); *G06T 2207/30096* (2013.01)

(56) References Cited

U.S. PATENT DOCUMENTS

| | | | |
|---|---|---|---|
| 2016/0123964 A1 | 5/2016 | Tumeh et al. | |
| 2017/0137885 A1* | 5/2017 | Salomon | G16B 20/00 |
| 2017/0365053 A1 | 12/2017 | Yuan | |
| 2018/0089495 A1* | 3/2018 | Black | G06V 10/40 |
| 2018/0332925 A1 | 11/2018 | Bailey et al. | |
| 2019/0259499 A1 | 8/2019 | Hong et al. | |
| 2019/0365036 A1 | 12/2019 | Meeker | |
| 2020/0272919 A1 | 8/2020 | Haimson et al. | |
| 2022/0043251 A1* | 2/2022 | Moore | G06T 5/50 |
| 2023/0143860 A1 | 5/2023 | Li et al. | |

FOREIGN PATENT DOCUMENTS

| | | |
|---|---|---|
| WO | 2017198790 A1 | 11/2017 |
| WO | 2019108230 A1 | 6/2019 |
| WO | 2019110583 A1 | 6/2019 |
| WO | 2020083970 A1 | 4/2020 |
| WO | 2021236544 A1 | 11/2021 |

OTHER PUBLICATIONS

Maley et al., "An ecological measure of immune-cancer colocalization as a prognostic factor for breast cancer" (Year: 2015).*

Nawaz et al., "Beyond immune density: critical role of spatial heterogeneity in estrogen receptor-negative breast cancer" (Year: 2015).*

Yuan et al., "Spatial heterogeneity in the tumor microenvironment" (Year: 2016).*

International Preliminary Report on Patentability, mailed Aug. 26, 2022, for PCT Application No. PCT/US2021/032816, filed May 17, 2021, 6 pages.

International Search Report and Written Opinion, mailed Sep. 2, 2021, for PCT Application No. PCT/US2021/032816, filed May 17, 2021, 14 pages.

Yuan, Y. (Dec. 10, 2014), "Modelling the Spatial Heterogeneity and Molecular Correlates of Lymphocytic Infiltration in Triple-Negative Breast Cancer," J.R. Soc. Interface 12:20141153, 13 pages.

* cited by examiner

Calculate the distance of the lymphocyte to centroid of the convex hull formed by the nearest n (= 5) neighboring cells Discrimination analysis of biological objects into context-dependent classification

SPATIAL FEATURE ANALYSIS FOR DIGITAL PATHOLOGY IMAGES

PRIORITY

This application is a continuation of International Application No. PCT/US2021/032816, filed on May 17, 2021, which claims the benefit, under 35 U.S.C. § 119(e), of U.S. Provisional Patent Application No. 63/077,232, filed 11 Sep. 2020, and U.S. Provisional Patent Application No. 63/026,545, filed 18 May 2020.

FIELD

This application generally relates to image processing of digital pathology images to generate outputs characterizing spatial information of particular types of objects in the images. More particularly, a digital pathology image can be processed to generate a metric characterizing a spatial distribution and interrelation of depictions of biological objects of one or more types across all or part of the image.

BACKGROUND

Image analysis includes processing individual images to generate image-level results. For example, a result may be a binary result corresponding to an assessment as to whether the image includes a particular type of object. As another example, a result may include an image-level count of a number of objects of a particular type detected within an image. In the context of digital pathology, a result can include a count of cells of a particular type detected within an image of a sample, a ratio of a count of one type of cell relative to a count of another type of cell across the entire image, and/or a density of a particular type of cell.

This image-level approach can be convenient, as it can facilitate simplistic metadata storage and can be easily understood in terms of how the result was generated. However, this image-level approach can strip detail from the image, which may impede detecting details of a depicted circumstance and/or environment. This simplification can be particularly impactful in the digital pathology context, as the current or potential future activity of particular types of cells can heavily depend on a microenvironment.

Therefore, it would be advantageous to develop techniques to process digital pathology images to generate an output reflective of a spatial characterization of depicted biological objects.

SUMMARY

In some embodiments, a computer-implemented method is provided that includes a digital pathology image processing system accessing a digital pathology image that depicts a section of a biological sample from a subject. The digital pathology image processing system detects, within the digital pathology image a first set of biological object depictions and a second set of biological object depictions. Each of the first set of biological object depictions depicts a first biological object of a first type of biological object. Each of the second set of biological object depictions depicts a second biological object of a second type of biological object. The digital pathology image processing system generates, using the first set of biological object depictions and the second set of biological object depictions, a spatial-distribution metric that characterizes locations of the first set of biological object depictions relative to the second set of biological object depictions. The digital pathology image processing system generates, using the spatial-distribution metric, a subject-level result corresponding to a predicted biological state of or a potential treatment for the subject. The digital pathology image processing system generates a display including the subject-level result. In particular embodiments, the first type of biological object includes a first type of cell and the second type of biological object includes a second type of cell. In particular embodiments, the first type of biological object includes lymphocytes and the second type of biological object includes tumor cells. In particular embodiments, the digital pathology image depicts the biological sample from the subject after it has been treated with one or more stains, each of the one or more stains enhancing the appearance one or more of the first type of biological object or the second type of biological object. In particular embodiments, the digital pathology image processing system generates the spatial-distribution metric by: identifying, for each first biological object depiction of the one or more first biological object depictions, a first point location within the digital pathology image corresponding to the first biological object depiction; identifying, for each second biological object depiction of the one or more second biological object depictions, a second point location within the digital pathology image corresponding to the second biological object depiction; and determining the spatial-distribution metric based on the first and second point locations. In particular embodiments, the first point location within the digital pathology image indicates a location of the first biological object depiction. In particular embodiments, the first point location within the digital pathology image is selected by calculating, for the first biological object depiction, a mean point location, a centroid point location, a median point location, or a weighted point location. In particular embodiments, the digital pathology image processing system generates the spatial-distribution metric by calculating, for each of at least some first biological object depictions of the one or more first biological object depictions and for each of at least some second biological object depictions of the one or more second biological object depictions, a distance between the first point location corresponding to the first biological object depictions and the second point location corresponding to the second biological object depictions. In particular embodiments, the digital pathology image processing system generates the spatial-distribution metric by identifying, for each of the at least some first biological object depictions of the one or more first biological object depictions, one or more of the second biological object depictions associated with a distance between the first biological object depiction and the second biological object depiction. In particular embodiments, the digital pathology image processing system generates the spatial-distribution metric by: defining a spatial lattice configured to divide an area of the digital pathology image into a set of image regions; assigning each first biological object depiction of the one or more first biological object depictions to an image region of the set of image regions; assigning each second biological object depiction of the one or more second biological object depictions to an image region of the set of image regions; and generating the spatial-distribution metric based on the image-region assignments. In particular embodiments, the digital pathology image processing system generates the spatial-distribution metric by determining a first set of one or more image regions of the set of image regions with a greater probability of including a first biological object depiction than a neighboring image region; determining a second set of one or more image regions of the set of image regions with a greater probability of including a second biological object depiction than a neighboring image region; and determining the spatial-distribution metric based further on the first set of image regions and the second set of image regions. The digital pathology image processing system generates the spatial-distribution metric by determining a third set of one or more image regions of the set of image regions with a greater probability of including both a first biological object depiction and a set biological object depiction than a neighboring image region; and determining the spatial-distribution metric based further on the third set of image regions. In particular embodiments, the digital pathology image processing system generates the subject-level result corresponding to the predicted biological state of or the potential treatment for the subject using the first spatial-distribution metric by comparing the spatial-distribution metric generated for the digital pathology image to a previous spatial-distribution metric generated for a previous digital pathology image; and outputting a subject-level result generated for the previous digital pathology image based on the comparison. In particular embodiments, the digital pathology image processing system generates the subject-level result by determining a diagnosis, prognosis, treatment recommendation, or treatment eligibility evaluation for the subject based on processing the spatial-distribution metric and the first set of biological object depictions and the second set of biological object depictions using a trained machine-learning model. In particular embodiments, the spatial-distribution metric includes a metric defined based on a K-nearest-neighbor analysis; a metric defined based on Ripley's K-function; a Morisita-Horn index; a Moran's index; a metric defined based on a correlation function; a metric defined based on a hotspot/coldspot analysis; or a metric defined based on a Kriging-based analysis. In particular embodiments, the spatial-distribution metric is of a first type of metric. The digital pathology image processing system generates, using the first set of biological object depictions and the second set of biological object depictions, a second spatial-distribution metric that characterizes locations of the first set of biological object depictions relative to the second set of biological object depictions. The second spatial-distribution metric is of a second type of metric that is different from the first type of metric. The subject-level result is generated further using the second spatial-distribution metric. In particular embodiments, the digital pathology image processing system receives user input data from a user device, including an identifier of the subject or of the digital pathology image. The digital pathology image is accessed based on the received user input data. The digital pathology image processing system provides the subject-level result for display by providing the subject-level result to the user device. In particular embodiments, the digital pathology image processing system outputs a clinical assessment to a user device of the subject. The clinical assessment includes a diagnosis, prognosis, treatment recommendation, or treatment eligibility evaluation for the subject.

In some embodiments, a method is provided that includes accessing, by a digital pathology image processing system, a digital pathology image that depicts a section of a biological sample collected from a subject having a given medical condition. The digital pathology image processing system detects, within the digital pathology image, a set of biological object depictions. The set of biological object depictions includes a first set of biological object depictions of a first class of biological object and a second set of biological object depictions of a second class of biological object. The digital pathology image processing system generates one or more relational-location representations of the biological object depictions. Each of the one or more relational-location representations indicates a location of a first biological object depiction relative to a second biological object depiction. The digital pathology image processing system determines, using the one or more relational-location representations, a spatial-distribution metric characterizing a degree to which at least part of the first set of biological object depictions are depicted as being interspersed with at least part of the second set of biological object depictions. The digital pathology image processing system generates, based on the spatial-distribution metric, a result that corresponds to a prediction regarding a degree to which a given treatment that modulates immunological response will effectively treat the given medical condition of the subject. The digital pathology image processing system determines that the subject is eligible for a clinical trial based on the result. The digital pathology image processing system generates a display including an indication that the subject is eligible for the clinical trial. In particular embodiments, the spatial-distribution metric includes a metric defined based on a K-nearest-neighbor analysis, a metric defined based on Ripley's K-function, a Morisita-Horn index, a Moran's index, a metric defined based on a correlation function, a metric defined based on a hotspot/coldspot analysis, or a metric defined based on a Kriging-based analysis. In particular embodiments, the spatial-distribution metric is of a first type of metric; and the digital pathology image processing system determines, using the one or more relational-location representations, a second spatial-distribution metric characterizing the degree to which at least part of the first set of biological object depictions are depicted as being interspersed with at least part of the second set of biological object depictions. The second spatial-distribution metric is of a second type of metric that is different from the first type of metric. The result is generated further based on the second spatial-distribution metric. In particular embodiments, generating the result includes the digital pathology image processing system that processes the first spatial-distribution metric and the section spatial-distribution metric using a trained machine-learning model. The trained machine-learning model has been trained using a set of training elements. Each of the set of training elements corresponds to another subject having received the particular treatment associated with the clinical trial. Each of the set of training elements includes another set of spatial-distribution metrics and a responsiveness value indicating a degree to which the given treatment activated an immunological response in the other subject. In particular embodiments, generating the result including comparing a value of the spatial-distribution metric to a threshold value. In particular embodiments, the given medical condition is a type of cancer and the given treatment is an immune-checkpoint-blockade treatment. In particular embodiments, the one or more relational-location representations include, for each biological object depiction of the set of biological object depictions, a set of coordinates that identifies a location of the biological object depiction within the digital pathology image. In particular embodiments, generating the one or more relational-location representation of the biological object depictions includes: identifying, for each biological object depiction of the first set of biological object depictions, a first point location within the digital pathology image corresponding to the biological object depiction; identifying, for each biological object depiction of the second set of biological object depictions, a second point location within the digital pathology image corresponding to the biological object depiction; and comparing the first point location and the second point location. In particular embodiments, the first point location within the digital pathology image is selected by calculating, for the biological object depiction of the first set of biological object depictions, a mean point location, a centroid point location, a median point location, or a weighted point location. In particular embodiments, the digital pathology image processing system determines the spatial-distribution metric by calculating, for each of at least some of the first set of biological object depictions and for each of at least some of the second set of biological object depictions, a distance between the first point location corresponding to the biological object depiction of the first set of biological object depictions and the second point location corresponding to the biological object depictions of the second set of biological object depictions. In particular embodiments, the digital pathology image processing system determines the spatial-distribution metric by identifying, for each of the at least some of the first set of biological object depictions, one or more of the second set of biological object depictions associated with a distance between the first point location corresponding to the biological object depiction of the first set of the biological object depictions and the second point location corresponding to the biological object depiction of the second set of biological object depictions. In particular embodiments, the one or more relational-location representations include, for each of a set of image regions in the digital pathology image, a representation of an absolute or relative quantity of biological object depictions of the first class of biological object identified as being located within the region and an absolute or relative quantity of biological object depictions of the second class of biological object identified as being located within the region. In particular embodiments, the one or more relational-location representations include a distance-based probability of a biological object depiction of the first set of biological object depictions being depicted as located within a given distance from a biological object depiction of the second set of biological object depictions. In particular embodiments, the digital pathology image processing system accesses genetic sequencing or radiology imaging data for the subject, wherein the result is generated further based on a characteristic of the genetic sequencing or radiology imaging data. In particular embodiments, the first class of biological object is a tumor cell and the second class of biological object is an immune cell. In particular embodiments, the digital pathology image processing system receives user input data from a user device including an identifier of the subject and accesses the digital pathology image in response to receiving the identifier. The digital pathology image processing system generates a display including the indication that the subject is eligible for the clinical trial by providing the indication that the subject is eligible for the clinical trial to the user device. In particular embodiments, the digital pathology image processing system receives an indication that the subject has been enrolled in the clinical trial. In particular embodiments, the digital pathology image processing system generates the display including the indication that the subject is eligible for the clinical trial by informing the subject of the determination of eligibility for the clinical trial.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed can be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
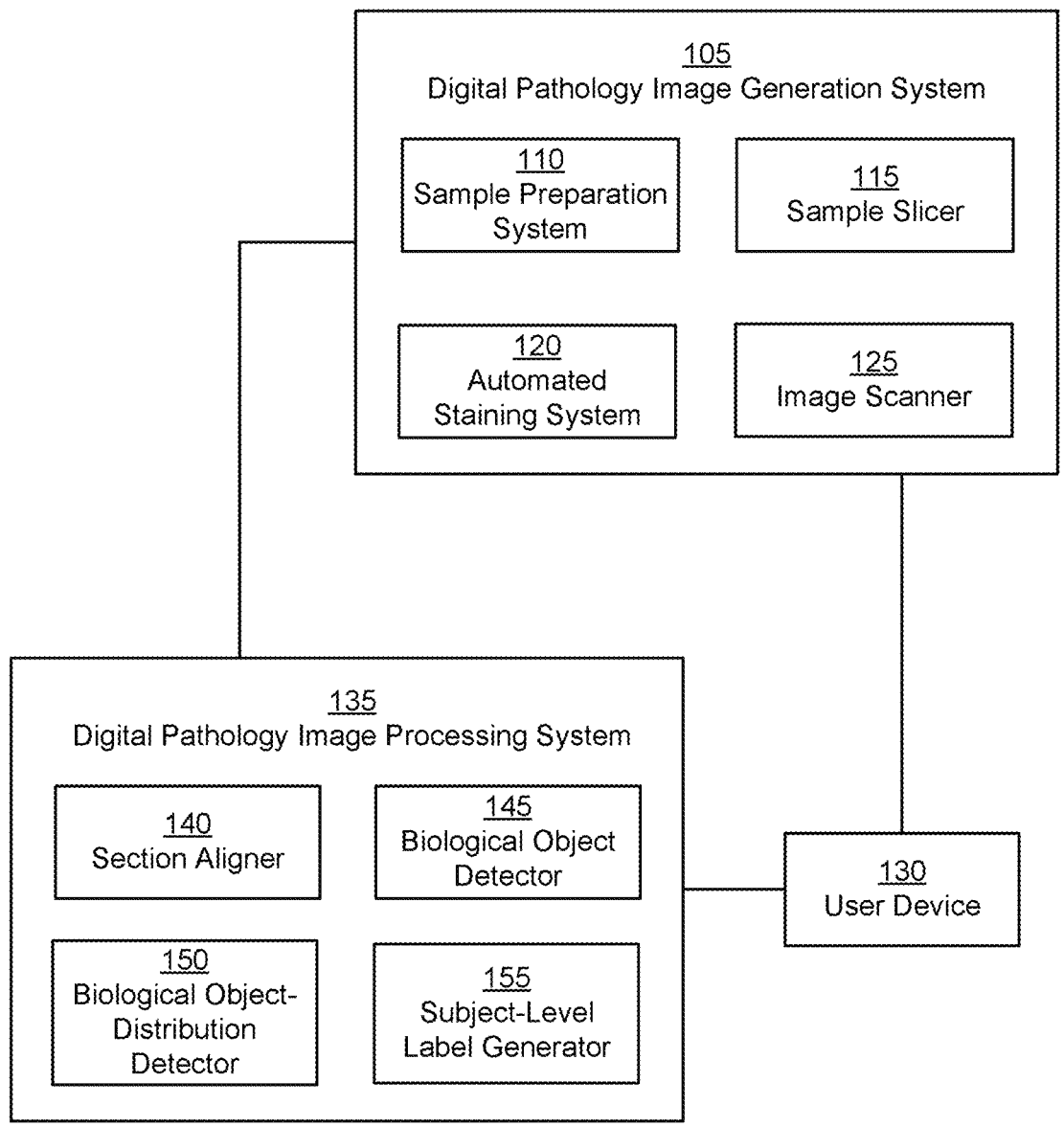
FIG. 1 shows an interaction system for generating and processing digital pathology images to characterize relative spatial information of biological objects according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Digital images are increasingly used in the medical context to facilitate clinical assessments such as diagnoses, prognoses, treatment selections, and treatment evaluations, among a variety of other uses. In the field of digital pathology, processing of digital pathology images can be performed to estimate whether a given image includes depictions of a particular type or class of biological object. For example, a section of a tissue sample can be stained such that depictions of biological objects of a particular type (e.g., a particular type of cell, a particular type of cell organelle or blood vessels) are to preferentially absorb the stain and thus be depicted with a higher intensity of a particular color. The tissue sample can be imaged according to techniques disclosed herein. The digital pathology image can then be processed to detect biological object depictions. Detections of biological object depictions can be based on biological objects meeting certain criteria under analysis corresponding to the stain profile, such as having a size within a defined range, a shape of a defined type, a continuity of high-intensity pixels of at least a defined amount, etc. In particular embodiments, a clinical assessment or recommendation can made based on whether a depiction of a particular type or class of object was observed and/or a quantity of depictions of one or more particular types or classes of objects.

With the advance of imaging technology, digital imaging of tumor tissue slides is becoming a routine clinical procedure for managing many types of conditions. Digital pathology images can capture multiple objects of a given type or class in high resolution. It can be advantageous to characterize a degree of spatial heterogeneity of biological objects captured in the digital pathology image and an extent to which the objects of the given type are spatially aggregated and/or distributed relative to each other and/or relatively to objects of a different type. Current, or potential, activity or functions of a biological object can vary drastically depending on a microenvironment of the biological object. Objectively characterizing locations of biological object depictions of a particular type can substantially affect a quality of a current diagnosis, prognosis, treatment evaluation, treatment selection, and/or treatment eligibility determination. Similarly, objectively characterizing the relationships of multiple types of biological objects within a digital pathology image or region of a digital pathology image can substantially affect the outcomes of the analysis. The locations and relationships of biological object depictions in a digital pathology image can correlate with the locations and relationship of the corresponding biological objects in the tissue samples of a subject. As disclosed herein, such objective spatial characterization can be performed by detecting, from a digital pathology image, a set of biological object depictions. The objects can be represented in accordance with one or more spatial analysis frameworks, including, but not limited to, a spatial-point-process analysis framework, a spatial-areal analysis framework, a geostatistical analysis framework, a graph-based framework, etc. In some embodiments, each detected biological object depiction is associated with a particular point location within the image and can be further associated with an identifier of a particular type of object. In some embodiments, for each of a set of regions within an image and for each of one or more particular types of objects, metadata can be stored that indicates a quantity or density of depictions of biological objects of each particular type predicted or determined to be located within the region.

Spatial aggregation can include measure of how objects within the digital pathology image are spatially aggregated or distributed over an entire digital pathology image or over a region of the digital pathology image. For example it can be advantageous to determine an extent to which biological objects of one type or class (e.g., lymphocytes) are spatially comingled with biological objects of another type or class (e.g., tumor cells). To illustrate, intra-tumoral tumor-infiltrating lymphocytes (TILs) are located within a tumor and have direct interaction with tumor cells, while stromal TILs are located in the tumor stroma and do not have direct interaction with tumor cells. Not only do intra-tumoral TILs have different activity patterns than stromal TILs, but each cell type can be associated with a different type of microenvironment further influencing the differences in behavior between the types of TILs. If a lymphocyte is detected at a particular location (e.g., within a tumor), the fact that the lymphocyte was able to infiltrate the tumor can convey information about the activity of the lymphocyte and/or of the tumor cells. Further, the microenvironment can affect a current and future activity of the lymphocyte. Identifying relative locations of biological objects of particular types can be particularly informative for predictive applications, such as identifying prognoses and treatment options, evaluating the eligibility of patients for clinical trials, and typifying immunological characteristics of the subject and their condition.

As another form of objective characterization of the locations and relations of detected biological object depictions, the detected biological object depictions can be used to generate one or more spatial-distribution metrics, which can characterize, at a region-, image- and/or subject-level, an extent to which biological objects of a given type or class are predicted as being interspersed with biological objects of another type or class, clustered with other objects of a same type, and/or clustered with biological objects of another given type. For example, a digital pathology image processing system can detect a first set of biological object depictions and a second set of biological object depictions in a digital pathology image. The system can predict that each of the first set of biological object depictions depicts a biological object of a first type (e.g., lymphocyte) and that each of the second set of biological object depictions depicts a biological object of a second type (e.g., tumor cell). The digital pathology image processing system can perform a distance-based assessment to generate a spatial-distribution metric that indicates an extent to which individual biological object depictions in the first set of biological object depictions are spatially integrated with or separated from individual biological object depictions in the second set of biological object depictions and/or an extent to which the first set of biological object depictions (e.g., collectively) are spatially integrated with or separated from the second set of biological object depictions (e.g., collectively). As disclosed herein, a variety of spatial-distribution metrics have been developed and applied for this purpose.

Principles and quantitative methods from advanced analytics (e.g. spatial statistics) can be applied to generate novel solutions to fulfil these needs. Techniques provided herein can be used to process a digital pathology image to generate a result that characterizes a spatial distribution and/or spatial pattern of depicted objects (e.g., biological objects) of one or more particular types or classes. The digital pathology image can include a digital image of a stained section of a sample. The processing can include detecting depictions of biological objects of each of multiple particular types (e.g., corresponding to biological cells of each of multiple types). Biological object detection can include detecting one or more of a set of first biological object depictions corresponding to a first biological object type and each of a set of second biological object depictions corresponding to a second biological object type. Additionally or alternatively, the object detection can include identifying, for each region of a set of regions within the digital pathology image and for each of the multiple particular biological object types-a higher-order metric that is defined to be reliant on and correlated with a quantity or lower-order metric of biological objects (e.g., a count, density, or image intensity that is inferred to represent a quantity of biological objects of the particular type presented within a corresponding image region). Moreover, the spatial-distribution metrics can be used in combination with other metrics (e.g. RNA sequencing, radiology imaging (CT, MRI, etc.)) to improve their predictive capabilities or to uncover novel biomarkers for unmet medical needs.

An image location of one or more biological object depictions can be determined. The image locations can be determined and represented in accordance with one or more spatial analysis frameworks, such as a spatial-point-process analysis framework, a spatial-areal analysis framework, a geostatistical analysis framework, or a graph-based analysis framework. For example, a biological object can be associated with a single point location within the digital pathology image. The single point location can indicate or be chosen as representative of the location of the depiction of the biological object within the digital pathology image, even though a depiction of a biological object can extend across multiple pixels or voxels. As another example, a biological object depiction can be collectively represented with or indicated by one or more other biological object depictions as contributing to a count of objects detected within a particular region of the image, a density of the biological objects detected within the particular region of the image, a pattern of the biological objects detected within the particular region of the image, etc.

A digital pathology image processing system can use spatial-distribution metrics to facilitate identification of, for example, a diagnosis, prognosis, treatment evaluation, treatment selection, and/or treatment eligibility (e.g., eligibility of a subject to be accepted or recommended for a clinical trial or a particular arm of the clinical trial). For example, particular prognoses can be identified in response to detecting a certain degree of infiltration of a set of biological objects of a first type or class within biological objects of a second type or class: more relevant and accurate prognoses can be identified in response to detecting higher lymphocytic infiltrate within individual tumors and/or metastatic tumor nests. As another example, a diagnosis of a tumor or cancer stage can be informed based on an extent to which immune cells are spatially integrated with cancerous cells (e.g., with a higher integration generally corresponding to a lower stage). As yet another example, a treatment efficacy can be determined to be higher when a spatial proximity of lymphocytes relative to tumor cells is small after commencing treatment relative to before treatment or relative to a projected proximity based on one or more prior assessments performed for a given subject.

The biological object detection can be used to produce a result, which may include or be based on a spatial distribution metric, that can indicate proximities between depictions of biological objects of the same or different types and/or an extent of co-localization of depictions of biological objects of one or more types. Co-localization of depictions of biological objects can represent similar locations of multiple cell types within each of one or more regions of the digital pathology image. The result can be indicative and/or predictive of interactions between different biological objects and types of biological objects that can be occurring within a microenvironment of a structure in a subject or patient that is indicated by the sample collected from the subject or patient. Such interactions can be supportive of and/or essential for biological processes, such as tissue formation, homeostasis, regeneration processes or immune responses, etc. The spatial information conveyed by the result can thus be informative as to the function and activity of particular biological structures and can thus be used as a quantitative underpinning to characterize, for example, a disease state and prognosis. A result that is indicative of where in a biological microenvironment particular biological objects are located can be used to select a treatment predicted to be effective (e.g., relative to other treatment options) for a particular subject or to predict other subject outcomes.

In particular embodiments, multiple spatial-distribution metrics can be generated. In particular one or more metrics can be generated, which each correspond to a metric type of one or more metric types. For example, one or more first metrics can be generated using a spatial-point-process analysis framework. The first metric can be based on distances between depictions of biological objects of different types. For example, a first metric can use a Euclidean distance between biological object depictions corresponding to tumor cells and biological object depictions corresponding to lymphocytes. Other distance metrics can also be used. One or more second metrics can be generated using a spatial-areal analysis framework. The second metric can characterize counts or densities of depictions of biological objects of a first type within various image regions relative to counts or densities of other depictions of biological objects of a second type.

A machine-learning model or rule can be used to generate a result corresponding, for example, to a diagnosis, prognosis, treatment evaluation, treatment selection, treatment eligibility (e.g., eligibility to be accepted or recommended for a clinical trial or a particular arm of a clinical trial), and/or prediction of a genetic mutation, gene alteration, biomarker expression levels (including, but not limited to genes or proteins), etc., using one or more metrics, which each correspond to a metric type of one or more metric types. The machine-learning model can include, by way of example and not limitation, a classification, regression, decision-tree or neural-network technique that is trained to learn one or more weights to use when processing the metrics to produce the result.

A digital pathology image processing system can further identify and learn to recognize patterns of locations and relationships of detected biological object depictions based in part on one or more spatial-distribution metrics. For example, the digital pathology image processing system can detect patterns of locations and relationships of detected biological object depictions in a digital pathology image of a first sample. The digital pathology image processing system can generate a mask, or other pattern storage data structure, from recognized patterns. The digital pathology image processing system can predict a diagnosis, prognosis, treatment evaluation, treatment selection, and/or treatment eligibility determination using the spatial-distribution metrics as described herein. The digital pathology image processing system can store the predicted prognosis, etc. in association with the detected pattern(s) and/or the generated mask. The digital pathology image processing system can receive a subject outcome to validate the predicted prognosis, etc.

The digital pathology image processing system can then, when processing a second digital pathology image from a second sample, detect patterns of locations and relationships of detected biological object depictions in the second digital pathology image. The digital pathology image processing system can recognize a similarity between the patterns of locations and relationships detected in the second digital pathology image and the mask or stored detected pattern from the first digital pathology image. The digital pathology image processing system can inform a predicted prognosis, treatment recommendation, or treatment eligibility determination based on the recognized similarity and/or subject outcome. As an example, the digital pathology image processing system can compare the stored mask to the pattern of locations and relationships of detected biological object depictions in the second digital pathology image. The digital pathology image processing system can determine one or more spatial-distribution metrics for the second digital pathology image and base the comparison of the stored mask to the recognized patterns from the second digital pathology image on a comparison of the spatial-distribution metrics of the detected biological object depictions in the first digital pathology image and the second digital pathology image.

The patterns detected from a first digital pathology image processing system can relate in many ways to the location and relationship of one or more first biological object depictions of one or more types. For example, the patterns can relate to the location and relationships of first biological objects of a first type in the digital pathology image without the context of other biological object depictions in the digital pathology image. The pattern can relate to an abstracted representation of the location and/or relationships of biological object depictions within the bounds of the digital pathology image (e.g., evaluating the coordinates of the detected biological object depictions, potentially devoid of their context as biological object depictions). As another example, the patterns can relate to the location and relationships of biological object depictions of a first type relative to all of other biological object depictions in the digital pathology image. As yet another example, the patterns can relate to the location and relationships of one or more biological object depictions of a first type relative to the location and relationships of one or more biological object depictions of the second type.

Patterns detected from digital pathology images can be associated with a context that includes, for example, the type of sample which the digital pathology image depicts (e.g., lung biopsy, liver tissue sample, blood sample, formalin fixed paraffin embedded specimen, frozen specimen, cell preparations obtained from surgical exhaeresis, biopsy procedures, including but not limited to core needle biopsy fine needle aspirate, etc., from various organs, tumors, and/or metastasis sties, etc.), the method of preparation for the sample (e.g., the type of stain used, the age of the sample, etc.), the number and specific type of biological objects (e.g., type of sample cell, structures—such as glands, tumor islets, sheets of cells, blood vessels etc.—individual cells—such as tumor cells, immune cells, mitotic cells, stromal cells, endothelial cells, etc.—and components of cells—such as nuclei, cytoplasm, membranes, cilia, mucus excretions, etc.) depicted in the sample overall or incorporated into the pattern, the number and type of spatial-distribution metrics used to detect or prepare the pattern, the type of subject-level result associated with the pattern, the indication within the type of subject-level result, the degree of validation of the subject-level result, and many other factors going towards characterizing the patterns detected from the digital pathology image. The context can be used to improve recognition and application of the pattern(s) to future digital pathology image.

Although in some embodiments patterns can be applied only to samples of the same type, biological object depictions of the same type, spatial-distribution metrics of the same type, subject-level results of the sample type, etc., the digital pathology image processing system can be trained to apply the pattern recognition methodology across types. For example, the digital pathology image processing system can be trained to recognize the broad applicability of patterns relating to infiltration and arrangement of lymphocytes into tissue sample cells and provide similar subject-level results based on analysis of digital pathology images corresponding to tissues samples of different types. The ability to reference and apply patterns across can be based on the applicability of spatial-distribution metrics relating to different types of detected biological object depictions and across digital pathology images of different tissue sample types. The spatial-distribution metrics provide an objective, quantifiable measure for diverse comparisons.

Additionally or alternatively, the digital pathology image processing system can further use the spatial-distribution metrics to facilitate identification of a treatment selection. For example, immunotherapy or immune-checkpoint therapy can be selectively recommended upon detecting an output indicating that lymphocytes are spatially integrated with tumor cells. As another example, atezolizumab plus bevacizumab plus carboplatin plus paclitaxel (ABCP) or atezolizumab plus carboplatin plus paclitaxel (ACP) can be selectively recommended over another chemotherapy treatment upon detecting an output indicating that lymphocytes are spatially integrated with tumor cells. The other chemotherapy treatment can include or can be bevacizumab plus carboplatin plus paclitaxel (BCP). Other approaches can use other biological objects or cell components or compartments for predicting diagnosis, biomarker expression, or treatment response (e.g., distribution of blood vessels, distribution of specific nuclear features in lymphoma, etc.).

Facilitating identification of a diagnosis, prognosis, treatment evaluation, treatment selection, and/or treatment eligibility, can include automatically generating a potential diagnosis, prognosis, treatment evaluation and/or treatment selection. The automatic identification can be based on one or more learned and/or static rules. A rule can have an if-then format which can include, in the condition, an inequality and/or one or more thresholds which may indicate, for example, that a metric above a threshold is associated with a suitability of a particular treatment. A rule can alternatively or additionally include a function, such as a function that relates a numeric metric to a severity score for a disease or a quantified score of eligibility for a treatment. The digital pathology image processing system can output the potential diagnosis, prognosis, treatment evaluation, treatment selection, and/or treatment eligibility determination as a recommendation and/or prediction. For example, the digital pathology image processing system can provide the output to a locally-coupled display, transmit the output to a remote device or access terminal a remote device, store the result in local or remote data storage, etc. In this manner, a human user (e.g., a physician and/or medical-care provider) can use the automatically generated output or form a different assessment informed by the quantitate metrics discussed herein.

Facilitating identification of a diagnosis, prognosis, treatment evaluation, treatment selection, and/or treatment eligibility determination can include outputting the spatial-distribution metric consistent with the disclosed subject matter. For example, an output can include an identifier of a subject (e.g., a name of a subject), stored clinical data associated with the subject (e.g., a past diagnosis, possible diagnosis, current treatment, symptoms, test results, and/or vital signs) and determined spatial-distribution metrics. The output can include a digital pathology image from which the spatial-distribution metric(s) were derived and/or a modified version thereof. For example, a modified version of the digital pathology image can include an overlay and/or markings that identify each biological object depiction detected in the digital pathology image. The modified version of the digital pathology image can further provide information about the detected biological object depictions. For example, for each biological object depiction, an interactive overlay can provide a particular object category corresponding to the object. A human user (e.g., a physician and/or medical-care provider) can then use the output, including the spatial-distribution metrics, to identify a diagnosis, prognosis, treatment evaluation, treatment selection, or treatment eligibility determination.

In particular embodiments, multiple types of spatial-distribution metrics are generated using biological object depictions detected from a single digital pathology image. The multiple types of spatial-distribution metrics can be used in combination according to the subject matter disclosed herein. The multiple types of spatial-distribution metrics can correspond to different or same frameworks relating to, for example, how a location of each biological object depiction is characterized. The multiple types of spatial-distribution metrics can include different variable types (e.g., calculated using different algorithms) and can be presented on different value scales. The multiple types of spatial-distribution metrics can be collectively processed using a rule or machine-learning model to generate a label. The label can correspond to a predicted diagnosis, prognosis, treatment evaluation, treatment selection, and/or treatment eligibility determination.

In particular embodiments, a computer-implemented method is provided. A digital pathology image processing system can access one or more digital pathology images. Each of the one or more digital pathology images can depict a section of a biological sample from a subject. The depicted section can include one that was stained with one or more stains. The digital pathology image processing system detects a first set of biological object depictions and a second set of biological object depictions within each of the one or more digital pathology images. Each of the first set of biological object depictions can depict a first type of biological object. Each of the second set of object depictions can depict a second type of biological object. Using the first set of biological object depictions and the second set of biological object depictions, the digital pathology image processing system generates one or more spatial-distribution metrics of a first type of spatial-distribution metric. Each of the one or more first spatial-distribution metrics characterize locations of the first set of biological object depictions relative to the second set of biological object depictions. Using the first set of biological object depictions and the second set of biological object depictions, the digital pathology image processing system generates one or more spatial-distribution metrics of a second type. The spatial-distribution metrics of the second type characterize locations of the first set of biological object depictions relative to the second set of biological object depictions. Using the one or more first spatial-distribution metrics and the one or more second spatial-distribution metrics, the digital pathology image processing system can generate a subject-level result that corresponds to a predicted biological state of or a potential treatment for the subject. The digital pathology image processing system provides the subject-level result for display. In addition to providing the subject-level result, the digital pathology image processing system can provide a clinical assessment to the subject based on the subject-level result. The clinical assessment can include a diagnosis, a prognosis, a treatment evaluation, a treatment selection, and/or treatment eligibility.

Spatial-distribution metrics that characterize locations the first set of biological object depictions can be determined based on, by way of example and not limitation, a point process, an areal/lattice process, a geostatistics process, etc. In particular embodiments, the first type of biological object can include a first type of cell, and the second type of biological object can include a second type of cell. As an example, the first type of biological object can include lymphocytes and the second type of biological object can include tumor cells. As another example, the first type of biological object can include macrophages and the second type of biological object can include fibroblasts. In particular embodiments, the first type of biological object can include a first class of biological object defined, for example, by feature characteristics of a first type (e.g., size, shape, color, expected behavior, texture, of the biological object or a component or compartment of the biological object) and the second type of biological object can include a second class of biological object defined, for example by feature characteristics of a second type or feature characteristics of a variation of the first type. It will be appreciated that the subject matter disclosed herein can be equally applicable to any biological object that can be represented as a point corresponding to a location in a digital pathology image.

In particular embodiments, generating the one or more spatial-distribution metrics of the first type can include identifying, for each first biological object depiction of the one or more first biological object depiction, a first point location within the one or more digital pathology images. The first point location can correspond to a location of the depicted first biological object. Generating the one or more spatial-distribution metrics of the first type can further include identifying, for each second biological object of the one or more second biological objects, a second point location within the one or more digital pathology images. The second point location can correspond to a location of the depicted second biological object. Generating the one or more spatial-distribution metrics of the first type can further include determining the one or more spatial-distribution metrics of the first type based on the first and second point locations. In particular embodiments, generating the one or more spatial-distribution metrics can include performing a distance-based technique that assesses, for each first biological object of at least some of the one or more first biological objects and for each second biological object of at least some of the one or more second biological objects, a distance between the first point location corresponding to the first biological object and the second point location corresponding to the second biological object.

In particular embodiments, generating the one or more spatial-distribution metrics of the second type can include defining a spatial lattice configured to divide an area of a digital pathology image of the digital pathology images into a set of image regions. Generating the one or more spatial-distribution metrics of the second type can include assigning each second biological object of the one or more second biological objects to an image region of the set of image regions. Generating the one or more spatial-distribution metrics of the second type can include generating the one or more spatial-distribution metrics of the second type based on the image-region assignment of each second biological object of the one or more second biological objects.

Generating the subject-level result can include processing the one or more spatial-distribution metrics of the first type and the one or more spatial-distribution metrics of the second type using a trained machine-learning model. The trained machine-learning model can include, by way of example and not limitation, a regression model, a decision-tree model, or a neural-network model. The first type of metric can be one of a set of metric types. The second type of metric can be another of the set of metric types. The set of metric types can include a metric defined based on a K-nearest-neighbor analysis, a metric defined based on Ripley's K-function, a Morisita-Horn index, a Moran's index, Geary's C index, a G-function, a metric defined based on a correlation function, a metric defined based on a hotspot analysis or a coldspot analysis, or a metric defined based on a Kriging-based analysis.

In particular embodiments, a method is provided that includes: transmitting, from a client computing system to a remote computing system, a request communication to process one or more digital pathology images that depict a particular section of a biological sample from a subject, wherein, in response to receiving the request communication from the client computing system, the remote computing system accesses one or more digital pathology images and performs an analysis according to the subject matter disclosed herein.

In accordance with the subject matter disclosed herein, in particular embodiments, use of a subject-level result in the treatment of a subject is provided. The subject-level result can be provide according to the subject matter disclosed herein.

In particular embodiments, a method is provided. A digital pathology image is accessed at a digital pathology image processing system. The digital pathology image depicts a tissue slide stained with one or more stains and tissue of the tissue slide was collected from a subject having a particular medical condition. The digital pathology image includes depictions of one or more biological objects. The one or more biological objects can include a set of cells. The set of cells can include a set of tumor cells and a set of other cells. The set of other cells can be a set of immune cells or a set of stromal cells. The digital pathology image processing system can identify a set of locations within the digital pathology image corresponding to one or more biological objects, such as a tumor-cell location. Each tumor-cell location of the set of tumor-cell locations can correspond to a tumor cell of the set of tumor cells. The digital pathology image processing system can identify a set of other locations within the digital pathology image corresponding to one or more other biological objects, such as an other-cell location. Each other-cell location of the set of other-cell locations can correspond to a cell of the set of other cells. The digital pathology image processing system can generate one or more relational-location representations. Each of the one or more relational-location representations can indicate locations of a first at least some of the set of cells relative to locations of a second at least some of the set of cells. Using the one or more relational-location representations, the digital pathology image processing system can determine a set of spatial-distribution metrics. Each spatial-distribution metric of the set of spatial-distribution metrics can characterize a degree to which at least part of the set of other cells were depicted as being interspersed with at least part of the set of tumor cells. The digital pathology image processing system can generate a result based on the set of spatial-distribution metrics. The result corresponds to a prediction as to whether and/or a degree to which a particular treatment that modulates immunological response will effectively treat the particular medical condition of the subject. Based on the result, it is determined that the subject is eligible for a clinical trial. An indication that the subject is eligible for the clinical trial is output.

Generating the result may include processing the set of spatial heterogeneity metrics using a trained machine-learning model. The trained machine-learning model may have been trained using a set of training elements. Each of the set of training elements can correspond to another subject having received the particular treatment associated with the clinical trial. Each of the set of training elements can include another set of spatial heterogeneity metrics and a responsiveness value indicating whether and/or a degree to which the particular treatment activated an immunological response in the subject.

In particular embodiments, the medical condition can be a type of cancer and/or the particular treatment can be an immune-checkpoint-blockade treatment. The one or more relational-location representations can include, for each cell of the set of cells, a set of coordinates that identifies a location of a depiction of the cell within the digital pathology image. The one or more relational-location representations can include, for each of a set of regions in the digital pathology image, a representation of an absolute or relative quantity of tumor cells identified as being located within the region, of stromal cells and/or of immune cells identified as being located within the region. The one or more relational-location representations can indicate a distance-based probability of a cell of a first type being depicted as being located within a distance from a cell of a second type. Each of the first type and the second type can correspond to immune cells, stromal cells or tumor cells. Genetic sequencing and/or radiology imaging data can be collected for the subject. The result can further depend on a characteristic of the genetic sequencing and/or radiology imaging data.

The term "biological object depiction," as referred to herein, can refer to a particular portion of an image (e.g., one or more pixels, a defined regions of the image, etc.) that is or has been identified as corresponding to a particular type of biological object. A biological object depiction can depict a biological object (e.g., cell). An biological object depiction can include one or more pixels and/or one or more voxels. The pixel(s) or voxel(s) of an biological object depiction can correspond to, for example, a centroid, edge, center of mass, or entirety of what is predicted to be a depiction of a biological object. Biological object depictions can be identified using a machine-learning algorithm, one or more static rules, and/or computer-vision techniques. Applied to digital pathology images. The image can depict a stained section, and the stain can have been selected to be preferentially absorbed by biological objects of a particular type of interest, such that identification of biological object depictions can include an intensity-based assessment.

The term "biological object," as referred to herein, can refer to a biological unit. A biological object can include, by way of example and not limitation, a cell, an organelle (e.g., a nucleus), a cell membrane, stroma, a tumor, or a blood vessel. It will be appreciated that a biological object can include a three-dimensional object, and a digital pathology image can capture only a single two-dimensional slice of the object, which need not even fully extend across an entirety of the object along a plane of the two-dimensional slice. Nonetheless, references herein can refer to such a captured portion as depicting a biological object.

The term "type of biological object," or biological object type, as referred to herein, can refer to a category of biological units. By way of example and not limitation, a type of biological object can refer to cells (generally), a particular type of cell (e.g., lymphocytes or tumor cells), cell membranes (generally), etc. Some disclosures can refer to detecting biological object depictions corresponding to a first type of biological object and other biological object depictions corresponding to a second type of biological object. The first and second types of biological object can have similar, same, or different levels of specificity and/or generality. For example, the first and second types of biological objects can be identified as lymphocyte and tumor cell types, respectively. As another example, a first type of biological object can be identified as lymphocytes, and a second type of biological object can be identified a tumor.

The term "spatial-distribution metric," as referred to herein, can refer to a metric that characterizes a spatial arrangement of particular biological object depictions in an image relative to each other and/or relative to other particular biological object depictions. The spatial-distribution metric can characterize an extent to which biological objects of one type (e.g., lymphocytes) have infiltrated another type of biological object (e.g., a tumor), are interspersed with objects of another type (e.g., tumor cells), are physically proximate with objects of another type (e.g., tumor cells) and/or are co-localized with objects of another type (e.g., tumor cells).

FIG. 1 shows an interaction system or network 100 of interacting system (e.g., specially-configured computer systems) that can be used, according to the disclosed subject matter, for generating and processing digital pathology images to characterize relative spatial information of biological objects according to some embodiments.

A digital pathology image generation system 105 can generate one or more digital images corresponding to a particular sample. For example, an image generated by digital pathology image generation system 105 can include a stained section of a biopsy sample. As another example, an image generated by digital pathology image generation system 105 can include a slide image (e.g., a blood film) of a liquid sample. As another example, an image generated by digital pathology image generation system 105 can include fluorescence microscopy such as a slide image depicting fluorescence in situ hybridization (FISH) after a fluorescent probe has been bound to a target DNA or RNA sequence.

Some types of samples (e.g., biopsies, solid samples and/or samples including tissue) can be processed by a sample preparation system 110 to fix and/or embed the sample. Sample preparation system 110 can facilitate infiltrating the sample with a fixating agent (e.g., liquid fixing agent, such as a formaldehyde solution) and/or embedding substance (e.g., a histological wax). For example, a fixation sub-system can fixate a sample by exposing the sample to a fixating agent for at least a threshold amount of time (e.g., at least 3 hours, at least 6 hours, or at least 12 hours). A dehydration sub-system can dehydrate the sample (e.g., by exposing the fixed sample and/or a portion of the fixed sample to one or more ethanol solutions) and potentially clear the dehydrated sample using a clearing intermediate agent (e.g., that includes ethanol and a histological wax). An embedding sub-system can infiltrate the sample (e.g., one or more times for corresponding predefined time periods) with a heated (e.g., and thus liquid) histological wax. The histological wax can include a paraffin wax and potentially one or more resins (e.g., styrene or polyethylene). The sample and wax can then be cooled, and the wax-infiltrated sample can then be blocked out.

A sample slicer 115 can receive the fixed and embedded sample and can produce a set of sections. Sample slicer 115 can expose the fixed and embedded sample to cool or cold temperatures. Sample slicer 115 can then cut the chilled sample (or a trimmed version thereof) to produce a set of sections. Each section can have a thickness that is (for example) less than 100 µm, less than 50 µm, less than 10 µm or less than 5 µm. Each section can have a thickness that is (for example) greater than 0.1 µm, greater than 1 µm, greater than 2 µm or greater than 4 µm. The cutting of the chilled sample can be performed in a warm water bath (e.g., at a temperature of at least 30° C., at least 35° C. or at least 40° C.).

An automated staining system 120 can facilitate staining one or more of the sample sections by exposing each section to one or more staining agents (e.g., hematoxylin and eosin, immunohistochemistry, or specialized stains). Each section can be exposed to a predefined volume of staining agent for a predefined period of time. In particular embodiments, a single section is concurrently or sequentially exposed to multiple staining agents.

Each of one or more stained sections can be presented to an image scanner 125, which can capture a digital image of the section. Image scanner 125 can include a microscope camera. The image scanner 125 can capture the digital image at multiple levels of magnification (e.g., using a 10× objective, 20× objective, 40× objective, etc.). Manipulation of the image can be used to capture a selected portion of the sample at the desired range of magnifications. Image scanner 125 can further capture annotations and/or morphometrics identified by a human operator. In particular embodiments, a section is returned to automated staining system 120 after one or more images are captured, such that the section can be washed, exposed to one or more other stains and imaged again. When multiple stains are used, the stains can be selected to have different color profiles, such that a first region of an image corresponding to a first section portion that absorbed a large amount of a first stain can be distinguished from a second region of the image (or a different image) corresponding to a second section portion that absorbed a large amount of a second stain.

It will be appreciated that one or more components of digital pathology image generation system 105 can, in particular embodiments, operate in connection with human operators. For example, human operators can move the sample across various sub-systems (e.g., of sample preparation system 110 or of digital pathology image generation system 105) and/or initiate or terminate operation of one or more sub-systems, systems or components of digital pathology image generation system 105. As another example, part or all of one or more components of digital pathology image generation system (e.g., one or more sub-systems of sample preparation system 110) can be partly or entirely replaced with actions of a human operator.

Further, it will be appreciated that, while various described and depicted functions and components of digital pathology image generation system 105 pertain to processing of a solid and/or biopsy sample, other embodiments can relate to a liquid sample (e.g., a blood sample). For example, digital pathology image generation system 105 can be configured to receive a liquid-sample (e.g., blood or urine) slide, that includes a base slide, smeared liquid sample and cover. Image scanner 125 can then capture an image of the sample slide. Further embodiments of the digital pathology image generation system 105 can relate to capturing images of samples using advanced imaging techniques, such as FISH, described herein. For example, once a florescent probe has been introduced to a sample and allowed to bind to a target sequence appropriate imaging can be used to capture images of the sample for further analysis.

A given sample can be associated with one or more users (e.g., one or more physicians, laboratory technicians and/or medical providers). An associated user can include a person who ordered a test or biopsy that produced a sample being imaged and/or a person with permission to receive results of a test or biopsy. For example, a user can correspond to a physician, a pathologist, a clinician, or a subject (from whom a sample was taken). A user can use one or one more devices 130 to (for example) initially submit one or more requests (e.g., that identify a subject) that a sample be processed by digital pathology image generation system 105 and that a resulting image be processed by an digital pathology image processing system 135.

In particular embodiments, digital pathology image generation system 105 transmits a digital pathology image produced by image scanner 125 back to user device 130, and user device 130 communicates with digital pathology image processing system 135 to initiate automated processing of the digital pathology image. In particular embodiments, digital pathology image generation system 105 avails a digital pathology image produced by image scanner 125 to digital pathology image processing system 135 directly, e.g., at the direction of the user of a user device 130. Although not illustrated, other intermediary devices (e.g., data stores of a server connected to the digital pathology image generation system 105 or digital pathology image processing system 135) can also be used. Additionally, for the sake of simplicity only one digital pathology image processing system 135, digital pathology image generating system 105, and user device 130 is illustrated in the network 100. This disclosure anticipates the use of one or more of each type of system and component thereof without necessarily deviating from the teachings of this disclosure Digital pathology image processing system 135 can be configured to identify spatial characteristics of an image and/or characterize a spatial distribution of the biological object depictions. A section aligner sub-system 140 can be configured to align multiple digital pathology images and/or regions of a digital pathology image corresponding to a same sample. For example, multiple digital pathology images can correspond to a same section of a same sample. Each image can depict the section stained with a different stain. As another example, each of multiple digital pathology images can correspond to different sections of a same sample (e.g., each corresponding to a same stain or for which different subsets of the images correspond to different stains). For example, alternating sections of a sample can have been stained with different stains.

Section aligner sub-system 140 can determine whether and/or how each digital pathology image is to be translated, rotated, magnified and/or warped such that digital pathology images corresponding to a single sample and/or to a single section are aligned. An alignment can be determined using (for example) a correlation assessment (e.g., to identify an alignment that maximizes a correlation).

A biological object detector sub-system 145 can be configured to automatically detect depictions of objects (e.g., biological objects) of one or more particular types in each of the aligned digital pathology images. Object types can include, for examples types of biological structures, such as cells. For example, a first set of biological objects can correspond to a first cell type (e.g., immune cells, leukocytes, lymphocytes, tumor-infiltrating lymphocytes, etc.), and a second set of biological objects can correspond to a second cell type (e.g., tumor cells, malignant tumor cells, etc.) or to a type of biological structure (e.g., tumors, malignant tumors, etc.). Biological object detector sub-system 145 can detect depictions of biological objects of each of one or more particular types from the aligned digital pathology images. The digital pathology images can depict various stains of a single digital pathology image. Such digital pathology images can include a single image, which can correspond to a section of a sample stained with each of multiple stains. For example, biological object detector sub-system 145 can detect depictions of lymphocytes and tumor cells from a single digital pathology image. Biological object detector 145 can detect depictions of biological objects from various digital pathology images, corresponding for example to various stains.

For example, depictions of lymphocytes can be detected in a first digital pathology image, while depictions of tumor cells can be detected in a second digital pathology image. A first digital pathology image can depict an image of a section of a sample stained with the first stain, and the second digital pathology image can depict the same section stained with a second stain and imaged again. Biological object detector sub-system 145 can detect depictions of biological objects of a first particular type in a first digital pathology image, which can correspond to a section of a sample stained with a first stain. Biological object detector sub-system 145 can detect depictions of biological objects of a second particular type shown in a second digital pathology image, which can correspond to the same section stained with a second stain or another section of the sample stained with the second stain. Furthermore, biological object detector sub-system 145 can detect one or more biological objects of one or more biological object types in one or more digital pathology images that are not related to the same sample, for the purpose of generating spatial-distribution metrics and subject-level results.

Biological object detector sub-system 145 can use static rules and/or a trained model to detect and characterize biological objects. Rules-based biological object detection can include detecting one or more edges, identifying a subset of edges that are sufficiently connected and closed in shape, and/or detecting one or more high-intensity regions or pixels. A portion of a digital pathology image can be determined to depict a biological object if, for example, an area of a region within a closed edge is within a predefined range and/or if a high-intensity region has a size within a predefined range. Detecting biological object depictions using a trained model can include employing a neural network, such as a convolutional neural network, a deep convolutional neural network and/or a graph-based convolutional neural network. The model can have been trained using annotated images that included annotations indicating locations and/or boundaries of objects. The annotated images can have been received from a data repository (e.g., a public data store) and/or from one or more devices associated with one or more human annotators. The model can have been trained using general-purpose or natural images (e.g., not solely images captured for digital pathology use or medical use generally). This can expand the ability of the model to differentiate biological objects of different types. It can have been trained using a specialized training set of images, such as digital pathology images, that have been selected for training the model to detect objects of a particular type.

Rules-based biological object detection and trained model biological object detection can be used in any combination. For example, rules-based biological object detection can detect depictions of one type of biological object while a trained model is used to detect depictions of another type of biological object. Another example can include validating results from rules-based biological object detection using biological objects output by a trained model, or validating results of the trained model using a rules-based approach. Yet another example can include using rules-based biological object detection as an initial object detection, then using a trained model for more refined biological object analysis, or applying a rules-based object detection approach to an image after depictions of an initial set of biological objects are detected via a trained network.

Biological object detection can also include (for example) pre-processing a digital pathology image. Pre-processing can transform a resolution of the digital pathology image to a target resolution, apply one or more color filters, and/or normalize the digital pathology image for use by the rules-based biological object detection methods or the trained model. For example, a color filter can be applied that passes colors corresponding to a color profile of a stain used by automated staining system 120. Rules-based biological object detection or trained model biological object detection can be applied to a pre-processed image.

For each detected biological object, biological object detector sub-system 145 can identify and store a representative location of the depicted biological object (e.g., centroid point or midpoint), a set of pixels or voxels corresponding to an edge of the depicted object and/or a set of pixels or voxels corresponding to an area of the depicted biological object. This biological object data can be stored with metadata for the biological object which can include, by way of example and not limitation, an identifier of the biological object (e.g., a numeric identifier), an identifier of a corresponding digital pathology image, an identifier of a corresponding region within a corresponding digital pathology image, an identifier of a corresponding subject, and/or an identifier of the type of object.

Biological object detector sub-system 145 can generate an annotated digital pathology image that includes the digital pathology image and further includes one or more overlays that identify where, within the image, a detected biological object is depicted. In particular embodiments, which multiple types of biological objects are detected, annotations of the different types can be represented, for example, using different colors.

An biological object distribution detector sub-system 150 can be configured to generate and/or characterize a spatial distribution of one or more objects. The distribution can be generated by (for example) using one or more static rules (e.g., that identify how to apply distance-based metrics of point-location representations of biological objects, that identify how to use absolute or smoothed counts or densities of biological objects within grid regions of a digital pathology image, etc.) and/or using a trained machine-learning model (e.g., which can predict that initial object-depiction data is to be adjusted in view of predicted quality of one or more digital pathology images). For example, the characterization can indicate an extent to which the biological objects of a particular type are depicted as being densely clustered with respect to each other, an extent to which depictions of biological objects of a particular type are spread across all or part of the image, how proximity of the depictions of biological objects of a particular type (relative to each other) compares to proximity of depictions of biological objects of another type (relative to each other), a proximity of depictions of biological objects of one or more particular types relative to depictions of biological objects of one or more other types, and/or an extent to which depictions of biological objects of one or more particular types are within and/or proximate to a region defined by one or more depictions of biological objects of one or more other types. As described in additional detail below in relation to FIG. 2, biological object-distribution detector sub-system 150 can initially generate a representation of the biological objects using a particular framework (e.g., a spatial-point-process analysis framework, a spatial-areal analysis framework, or a geostatistical analysis framework, etc.).

A subject-level label generator sub-system 155 can use the spatial-distribution metrics to generate one or more subject-level labels. Subject-level labels can include labels determined for an individual subject (e.g., patient), a defined group of subjects (e.g., patients with similar characteristics), an arm of a clinical study, etc. A label can correspond, for example, to a potential diagnosis, prognosis, treatment evaluation, treatment recommendation, or treatment eligibility determination. In particular embodiments, the label can be generated using a predefined or learned rule. For example, a rule can indicate that a spatial-distribution metric above a predefined threshold is to be associated with a particular medical condition (e.g., as a potential diagnosis), while a metric below the threshold is not to be associated with the particular medical condition. As another example, a rule can indicate that a particular treatment is to be recommended when a spatial-distribution metric is within a predefined range (e.g., and not otherwise). To illustrate, checkpoint immune therapy can be recommended when a distance-based metric (e.g., characterizing how far centroids of lymphocyte depictions are from centroids of tumor-cell depictions) is below a predefined threshold. As yet another example, a rule can identify different bands of treatment efficacy based on a ratio of a spatial-distribution metric corresponding to a recently collected digital pathology image over a stored baseline spatial-distribution metric corresponding to a digital pathology image collected less recently.

The subject-level label generator sub-system 155 can further use one or more patterns or masks, for example in conjunction with the spatial-distribution metrics, to generate one or more subject-level labels. In particular embodiments, the subject-level label generator sub-system 155 can retrieve or be provided one or more patterns or masks that are associated with prior labels and/or subject outcomes (which can serve to validate the labels). In particular embodiments, the subject-level label generator sub-system 155 can retrieve masks according to one or more rules or using a trained model. For example, a rule can indicate that a particular mask or subset of masks are to be retrieved and compared to a digital pathology image in response to a determination of one or more types of one or more biological objects depicted in the digital pathology image. As another example, a rule can indicate that a particular mask or subset of masks are to be retrieved and compared to a digital pathology image in response to a determination of a spatial-distribution metric satisfying, or failing to satisfy, a threshold value or occupying, or failing to occupy, a threshold range. The values associated with the rules can be learned by the subject-level label generator sub-system 155. In particular embodiments, a model can be trained using one or more machine-learning processes described herein, to identify a pattern to retrieve and apply to the digital pathology image based on a holistic characterization of the digital pathology image, data derived therefrom, and metadata associated therewith.

Digital pathology image processing system 135 can output the generated spatial-distribution metric(s), the subject-level label(s) and/or annotated image. The output can include a local presentation or a transmission (e.g., to user device 130).

Each component and/or system in FIG. 1 can include (for example) one or more computers, one or more servers, one or more processors and/or one or more computer-readable media. In particular embodiments, a single computing system (having one or more computers, one or more servers, one or more processors and/or one or more computer-readable media) can include multiple components depicted in FIG. 1. For example, digital pathology image processing system 135 can include a single server and/or collection of servers that collectively implements functionality of all of section aligner sub-system 140, biological object detector sub-system 145, biological object-distribution detector sub-system 150 and subject-level label generator sub-system 155.

It will be appreciated that various alternative embodiments are contemplated. For example, digital pathology image processing system 135 need not include subject-level label generator sub-system 155 and/or need not generate subject-level labels. Rather an annotated image (with annotations generated by biological object detector sub-system 145) and/or one or more spatial-distribution metrics (generated by biological object-distribution detector sub-system 150) can be output by digital pathology image processing system 135. A user can then identify a label (e.g., corresponding to a diagnosis, prognosis, treatment evaluation or treatment recommendation) in view of the output data.

Figure 2:
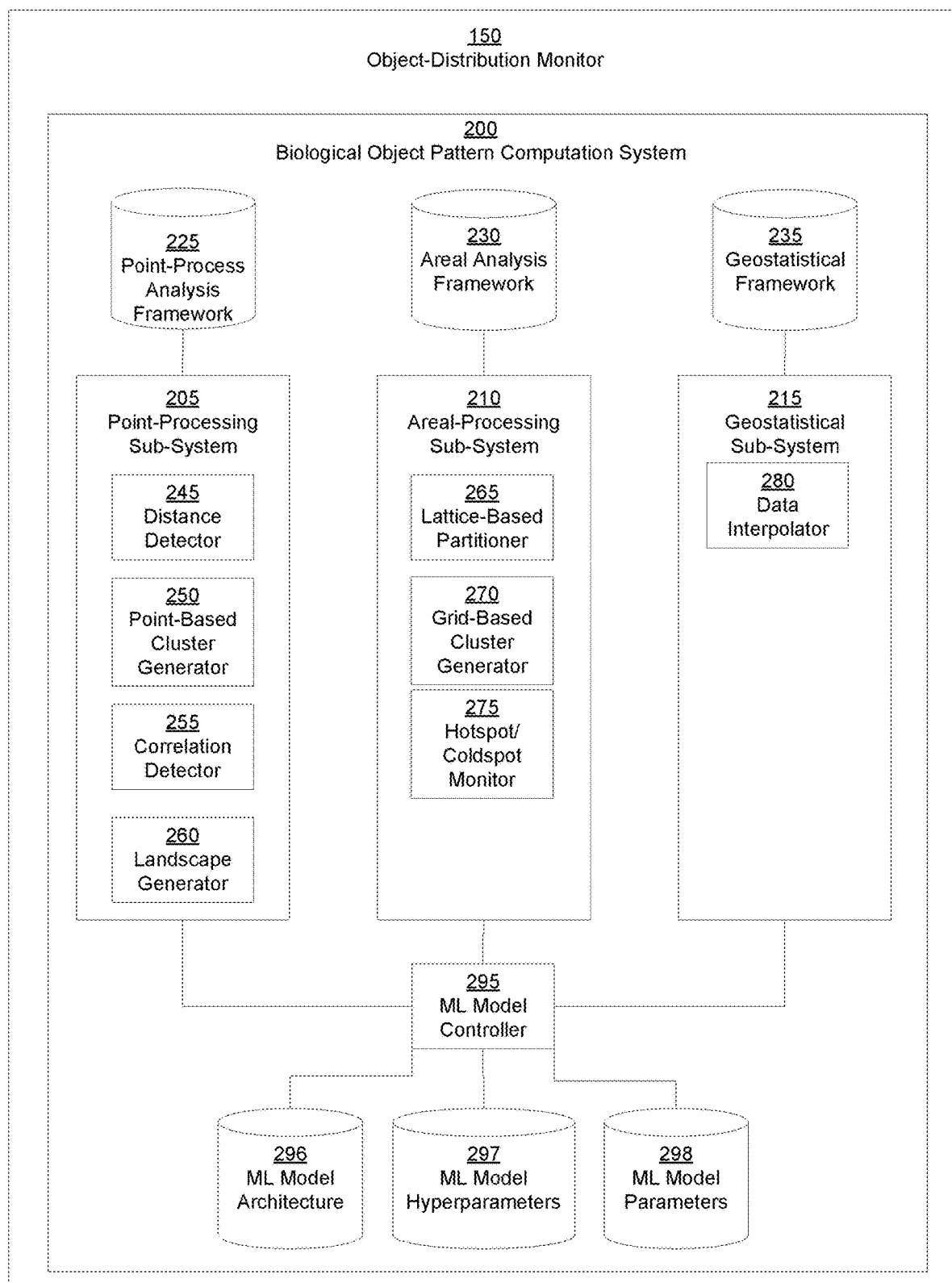
FIG. 2 shows an illustrative system for processing object-depiction data to generate spatial-distribution metrics according to some embodiments.

FIG. 2 shows an illustrative biological object pattern computation system 200 for processing object data to generate spatial-distribution metrics according to some embodiments of the invention. Biological object-distribution detector sub-system 150 can include part or all of system 200.

Biological object pattern computation system 200 includes multiple sub-systems: a point-processing sub-system 205, an areal-processing sub-system 210, and a geo-statistical sub-system 215. Each of the sub-systems corresponds to and uses a different framework to generate spatial-distribution metrics or the constituent data thereof: a point-process analysis framework 225, an a real-analysis framework 230, or a geostatistical framework 235. A point-process analysis framework 225 can have an object-specific focus, for example, a point location can be identified for each detected biological object depiction. An areal analysis framework 230 can be a framework in which data (e.g., locations of depicted biological objects) is indexed using coordinates and/or a spatial lattice rather than by individual biological object depictions. Geostatistical analysis framework 235 can provide a prediction of the prevalence and/or observation probability of a particular type of biological object depiction at each of a set of locations. Each framework can support generation of one or more metrics that characterize spatial patterns and/or distributions formed across depictions of one or more biological objects of each of one or more types.

For instance, point-processing sub-system 205 can employ a point-process analysis framework 225, in which each biological object depiction can be represented as a point location within an image. In particular embodiments, the point location can be a centroid, midpoint, or center of mass, etc., of the biological object depiction. In some embodiments, the point location is detected (e.g., by biological object detector sub-system 145) when detecting a biological object depiction. In some embodiments, point-processing sub-system 205 determines the location of the biological object depiction (e.g., based on locations associated with an edge and/or area of the depicted biological object). Point-processing sub-system 205 can include a distance detector 245 to detect and process one or more distances between biological object depictions; a point-based cluster generator 250 and a correlation detector 255 to characterize cross- and/or auto-correlations between one or more biological object depictions of each of one or more types; and a landscape generator 260 to generate a three-dimensional landscape corresponding to computed quantities of biological object depictions across a two-dimensional space corresponding to dimension of the image (e.g., with the third dimension of the landscape indicating the computed quantities). Cross- and auto-correlations can identify, as a function of distance, a probability of a point representing a biological object depiction (and hence, a biological object in a sample) of a first type being located the distance away from an observed biological object depiction. For cross-correlations, the probability is calculated for biological objects of a second type. For auto-correlations, the probability is calculated for biological objects of the first type. A cross- or auto-correlation can include a one-dimensional representation (e.g., with the x-axis set to distance) or a two-dimensional representation (e.g., with the x-axis set to a horizontal distance and y-axis set to vertical distance).

Distance detector 245 can detect points and locations of each of the points within an image. For each of one or more pairs of points (e.g., "point pairs"), a distance (e.g., a Euclidian distance) between the point locations associated with the pair is computed. Each of the one or more point pairs can correspond to biological object depictions of a same type or biological object depictions of different types. For example, with respect to a given depicted lymphocyte, distance detector 245 can identify the distances between the position of the depicted lymphocyte and each other depicted lymphocyte, and distance detector 245 can identify the distances between the position of the depicted lymphocyte and each depicted tumor cell. Distance detector 245 can generate one or more spatial-distribution metrics based on the statistics. For example, a spatial-distribution metric can be defined as and/or based on a mean, median and/or standard deviation, etc., of distances between depictions of biological objects of a given type and/or of distances between depictions of biological objects of one or more different types. To illustrate, distances between locations of all depicted lymphocytes can be detected and an average distance can then be calculated; a similar calculation can be performed based on distances between each lymphocyte-tumor-cell pair. A spatial-distribution metric can be based on a first statistic generated based on distances between depictions of biological objects of a first type and a second statistic generated based on distances between depictions of biological objects of a second type.

Point-based cluster generator 250 can use the distances to perform a cluster analysis (e.g., a multi-distance spatial cluster analysis, such as Ripley's K-function). For example, a K value generated using Ripley's K function can represent an estimated degree to which a spatial distribution of biological object depictions corresponds to a spatially random distribution (e.g., as opposed to a distribution having one or more spatial clusters).

Correlation detector 255 can use the distances and/or point locations to generate one or more correlation-based metrics. Correlation-based metric(s) can indicate an extent to which an existence of a depiction of a biological object of a given type at one location is predictive of whether another biological object depiction of the given type or of another type is present at another location. The other location can be specified, for example, based on a predefined spatial increment or target region surrounding the biological object depiction. For example, a cross-correlogram can identify a probability of observing a tumor-cell depiction within each of various distances from a depiction of a lymphocyte. A metric can identify a sum of the probabilities across distances from zero distance to a particular distance. A correlation-based metric can include a Randomized Dependence Coefficient or correlation coefficient. In particular embodiments, a correlation-based metric indicates a distance value associated with a maximum of a cross-correlogram.

Figure 4:
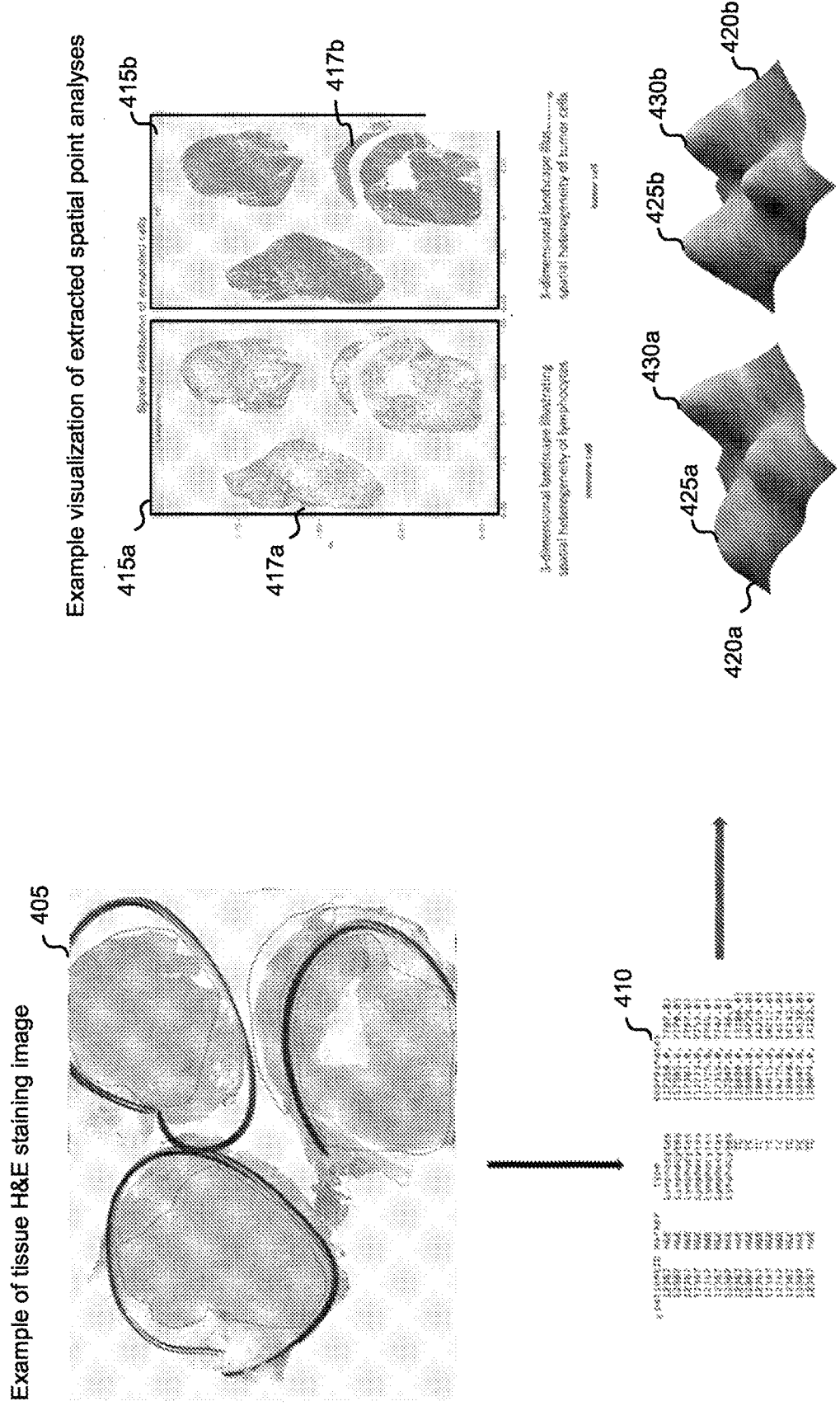
FIG. 4 illustrates a process for processing images using a landscape-based spatial-point-process analysis framework according to some embodiments.

Landscape generator 260 can use point locations of depictions of biological objects of a given type or types to generate a three-dimensional "landscape" data structure (e.g., a landscape map) that indicates, for each horizontal and vertical position of an image, a probability that a depiction of an object of the given type is observed. A landscape data structure can be identified by fitting one or more algorithms. For example, a data structure configured to represent zero, one or more Gaussians (or other peak structures) can be fit. Landscape generator 260 can be configured to compare the landscape data structure generated for a given biological object type to another landscape data structure generated for another biological object type. For example, landscape generator 260 can compare the location(s), amplitude(s) and/or width(s) of one or more peaks of a landscape corresponding to a given biological object type to the location(s), amplitude(s) and/or width(s) of one or more peaks of another landscape data structure corresponding to another biological object type. The landscape can include a three-dimensional representation for which, when visualized, peaks represent high probabilities of an object of a given type being located in the corresponding region. While landscape data representations represent density and/or counts of objects via a third dimension, the same data can alternatively be conveyed using other visualization approaches (e.g., via a heat map). Exemplary landscape data structures generated by landscape generator 260 are shown at FIG. 4, as landscape representations 420a and 420b.

While a point-process analysis framework 225 can index data by individual depictions of biological objects, areal analysis framework 230 can index data using coordinates and/or a spatial lattice in a more abstracted sense. The areal-processing sub-system 210 can apply the areal analysis framework 230 to identify a density (or count) for each of a set of coordinates and/or regions associated with an image area. The density can be identified using one or more of a lattice-based partitioner 265, a grid-based cluster monitor and/or a hotspot monitor 275.

Lattice-based partitioner 265, which can impose a spatial lattice onto an image, including a representation of locations of depicted biological objects on an image. The spatial lattice, including a set of rows and a set of columns, can define a set of regions, with each region corresponding to a row-column combination. Each row can have a defined height, and each column can have a defined width, such that each region of the spatial lattice can have a defined area.

Lattice-based partitioner 265 can determine an intensity metric using the spatial lattice and point locations of biological object depictions. For example, for each lattice region, an intensity metric can indicate and/or can be based on a quantity of biological object depictions of each of one or more types having point locations (e.g., for at least a threshold portion of the biological object depictions) within the region. In particular embodiments, the intensity metrics can be normalized and/or weighted based on a total number of biological objects (e.g., of a given type) detected within the digital pathology image and/or for the sample; counts of biological objects of the given type detected in other samples; and/or a scale of the digital pathology image. In particular embodiments, the intensity metrics are smoothed and/or otherwise transformed. For example, initial counts can be thresholded, such that final intensity metrics are binary. For example a binary metric can include a determination whether a lattice region is associated with a number of biological object depictions satisfying a threshold value (e.g., whether there were at least five tumor cells assigned to the region). In particular embodiments, lattice-based partitioner 265 can generate one or more spatial-distribution metrics using areal data by (for example) comparing intensity metrics across different types of biological objects.

Grid-based cluster generator 270 can generate one or more spatial-distribution metrics based on cluster-related data pertaining to one or more biological object types. For example, for each of one or more biological object types, a clustering and/or fitting technique can be applied to determine an extent to which depictions of biological objects of the type are spatially clustered with, for example, each other and/or with depictions of biological objects of another type. The clustering and/or fitting technique can be further applied to determine an extent to which depictions of biological object are spatially dispersed and/or randomly distributed. For example, grid-based cluster generator 270 can determine a Morsita-Horn index and/or Moran's index. For example, a single metric can indicate an extent to which depictions of biological objects of one type are spatially clustered and/or proximate to depictions of objects of another type.

Hotspot/coldspot monitor 275 can perform an analysis to detect any "hotspot" locations at which depictions of biological objects of one or more particular types are likely to exist or any "coldspot" locations at which depictions of biological objects of one or more particular types are likely not to exist. In particular embodiments, the lattice-partitioned intensity metrics can be used to (for example) identify local intensity extrema (e.g., maximum or minimum) and/or fit one or more peaks, which can be characterized as hotspots, or one or more valleys, which can be characterized as coldspots. In particular embodiments, a Getis-Ord Hotspot algorithm can be used to identify any hotspots (e.g., intensities across a set of adjacent pixels high enough to be significantly different as compared to other intensities in the digital pathology image) or any coldspots (e.g., intensities across a set of adjacent pixels low enough to be significantly different as compared to other intensities in the digital pathology image). In particular embodiments, "significantly different" can correspond to a determination of statistical significance. Once object-type-specific hotspots and coldspots are identified, hotspot/coldspot monitor 275 can compare the location, amplitude, and/or width of any hotspots or coldspots detected for one biological object type with the location, amplitude, and/or width of any hotspots/coldspots detected for another biological object type.

Geostatistical sub-system 215 can use a geostatistical analysis framework 235 to estimate an underlying smoothed distribution based on discrete samples. Geostatistical analysis framework 235 can be configured to transform data corresponding to a first dimensionality and/or resolution to a second dimensionality and/or resolution. For example, locations of biological object depictions can initially be defined using a 1-mm resolution across the digital pathology image. The location data can then be fit to a continuous function that is not constrained to the mm resolution. As another example, locations of biological object depictions that are initially defined as two-dimensional coordinates can be transformed to produce a data structure that includes a count of biological object depictions within each of a set of row-column combinations. A geostatistical analysis framework 235 can be configured to (for example) fit a function using multiple data points that identify the location of particular biological object depictions (of a given type). For example, a variogram can be generated for each particular type of biological object that indicates, for each of a set of distances, whether two biological objects of a same type separated by the distance were detected. It can be more likely that objects of a single type will be detected at short separation distances as compared to longer distances. A semivariogram can then be generated by fitting the variogram data. The observed biological objects and the semivariogram can then be used by geostatistical sub-system 215 to generate an image map that predicts the prevalence and/or observation probability of a depiction of a particular type of biological object at each of a set of locations. A resolution and/or size of the image map can be higher and/or larger, respectively, as compared to one or more digital pathology images that were processed to initially detect biological object depictions. Geostatistical sub-system 215 can generate one or more spatial-distribution metrics using geostatistical data by (for example) comparing predicted biological object values (e.g., predicting a prevalence and/or observation probability) across different types of biological objects, characterizing spatial correlation of predicted biological object values between different types of biological objects, characterizing spatial auto-correlation using predicted object values an individual type of biological object and/or comparing locations of spatial clusters (or hotspots/coldspots) of predicted object values across different types of objects.

It will be appreciated that various sub-systems can include components that are not depicted and can perform processing not explicitly described. For example, areal-processing-sub-system 210 can generate a spatial-distribution metric corresponding to an entropy-based mutual information measure to indicate an extent to which information about a location of a depiction of a biological object of a first type within a given region reduces an uncertainty about whether a depiction of another biological object (of a same or other type) exists at a location within another region. For example, a mutual information metric can indicate that locations of one biological object type provide information (and thus reduce the entropy) about the locations of another biological object type. Such mutual information can potentially be associated with instances in which cells of the one cell type are interspersed with cells of the other cell type (e.g., a tumor-infiltrating lymphocyte interspersed within tumor cells).

As another example, point-processing sub-system 205 can generate a nearest-neighbor distance metric based on a distances (or distance statistics) between individual biological object detection points of a given biological object type and one or more nearest other points corresponding to biological object depictions of the same biological object type and/or of another biological object type. To illustrate, for each depiction of a biological object, an intra-object-type distance value can refer to an average distance between a location of the depiction of the biological object and the locations of a nearest number depictions of biological objects of the same type. An intra-object-type distance statistic for a biological object type can refer to (for example) a mean or median of the intra-object-type distance values for all biological object depictions of the object type. Inter-object-type distance values can refer to an average distance between a location of a depiction of a biological object and the locations of a nearest number of depictions of objects of a different type. An inter-object-type distance statistic can be (for example) a mean or median of the inter-object-type distance values. Small/low inter-object-type distance statistics can indicate that the different types of depictions of biological objects are proximate to each other. Intra-object-type distance statistics can be used (for example) for normalization purposes or to assess general clustering of a given type of biological object.

As yet another example, point-processing sub-system 205 can generate a correlation-based metric based on cross- and/or auto-correlation function, such as a pair correlation (cross-type) function or a mark correlation function. A correlation function can include (for example) a correlation value as a function of distance. A baseline correlation value can correspond to a random distribution. A metric can include a spatial distance at which the correlation function (or at which a smoothed version of the correlation function) crosses the baseline correlation value (or some adjusted version of a baseline correlation value, such as a threshold calculated by adding a fixed amount to the baseline correlation value and/or multiple the baseline correlation value by a predefined factor).

Biological object pattern computation system 200 can generate a result (which can itself be a spatial-distribution metric) using a combination of multiple (e.g., two or more, three or more, four or more, or five or more) spatial-distribution metrics (e.g., such as those disclosed herein) of various types. The multiple spatial-distribution metrics can include metrics generated using different frameworks (e.g., two or more, three or more, or all of point-process analysis framework 225, areal analysis framework 230, and geostatistical framework 235) and/or metrics generated by different sub-systems (e.g., two or more, three or more, or all of point-processing sub-system 205, areal-processing sub-system 210 and geostatistical sub-system). For example, a spatial-distribution metric can be generated using distance-based metrics (generated using the spatial-point-process analysis framework) and Morisita-Horn index metrics (generated using the spatial-areal analysis framework).

In particular embodiments, the multiple metrics can be combined using one or more user-defined and/or predefined rules and/or using a trained model. For example, a machine-learning (ML) model controller 295 can train a machine-learning model so as to learn one or more parameters (e.g., weights) that specify how various lower level metrics are to be collectively processed to generate an integrated spatial-distribution metric. The integrated spatial-distribution metric can be more accurate in aggregate than the individual parameters alone. An architecture of the machine-learning model can be stored in a ML model architecture data store 296. For example, a machine-learning model can include a logistic regression, a linear regression, a decision tree, a random forest, a support vector machine, or a neural network (e.g., a feedforward neural network), and ML model architecture data store 296 can store one or more equations defining the model. Optionally, a ML model hyperparameter data store 297 stores one or more hyperparameters that are used to define the model and/or its training but are not learned. For example, a hyperparameter can identify a number of hidden layers, dropout, learning rate, etc. Learned parameters (e.g., corresponding to one or more weights, thresholds, coefficients, etc.) can be stored in a ML model parameter data store 298.

In particular embodiments, part or all of one or more sub-systems are trained using part or all of a same set of training data used to train a ML model (to thereby learn ML model parameters stores in ML model parameter data store 298). In particular embodiments, different training data sets are used to train one or more sub-systems as compared to the ML model controlled by ML model controller 295. Similarly, when multiple frameworks, sub-systems and/or sub-system components are used to generate metrics that are integrated to produce a spatial distribution metric, the individual frameworks, sub-systems and/or sub-system components can be trained using training data sets that are non-overlapping, partially overlapping, completely overlapping or the same with regard to the other training data set.

While not shown in FIG. 2, biological object pattern computation system 200 can further include one or more components to aggregate spatial-distribution metrics across sections of a subject's sample and generate one or more aggregated spatial-distribution metrics. Such aggregated metrics can be generated (for example) by a component within a sub-system (e.g., by hotspot monitor 275), by a sub-system (e.g., by point-processing sub-system 205), by ML model controller 295 and/or by biological object pattern computation system 200. An aggregated spatial-distribution metric can include (for example) a sum, median, average, maximum, or minimum of a set of section-specific metrics.

Figure 3A:
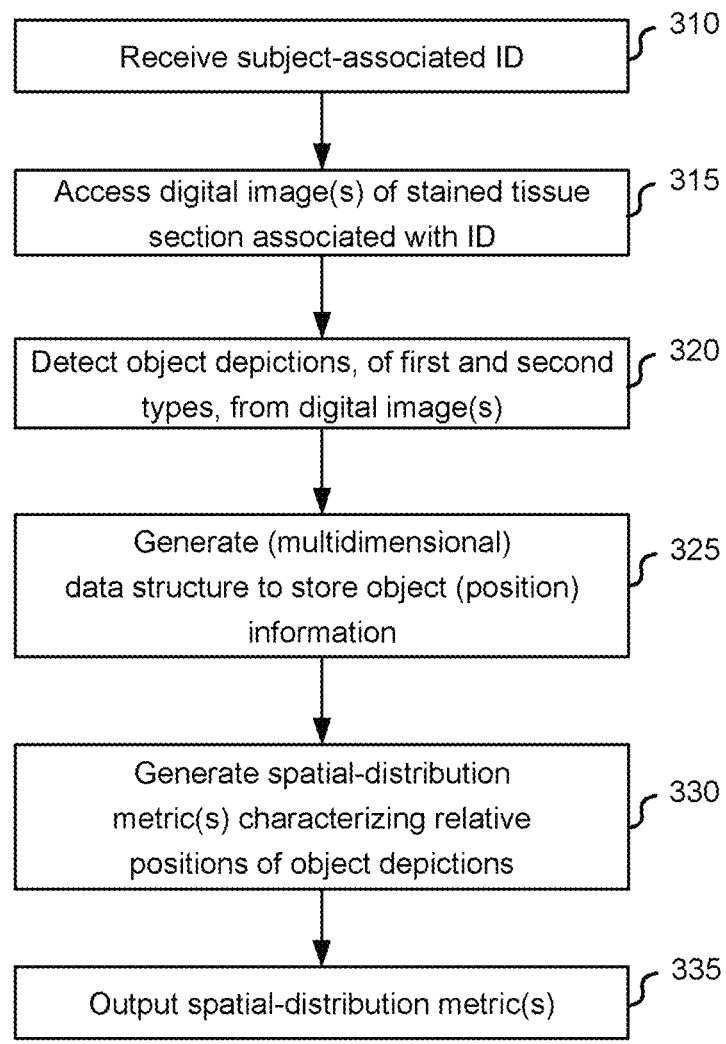
FIGS. 3A and 3B illustrate processes for providing health-related assessments based on spatially specific image processing of digital pathology images according to some embodiments.
Figure 3B:
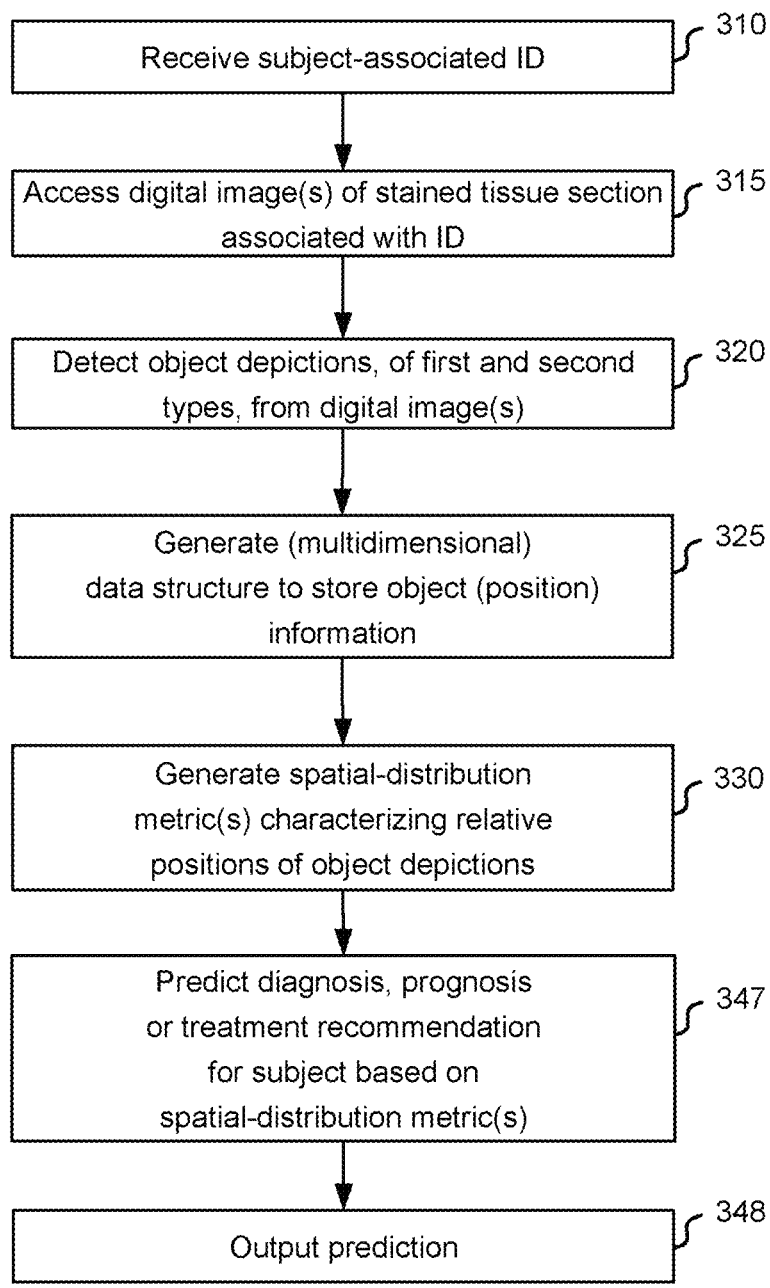

FIGS. 3A and 3B illustrate processes 300a and 300b for providing health-related assessments based on image processing of digital pathology images using spatial-distribution metrics according to some embodiments. More specifically, digital pathology images can be processed, e.g., by a digital pathology image processing system, to generate one or more metrics that characterize the spatial pattern(s) and/or distribution(s) of one or more cell types, and the metrics can then inform diagnosis, prognosis, treatment evaluation, or treatment eligibility decisions. The process begins at step 310, in which a subject-associated identifier can be received by a digital pathology image processing system (e.g., digital pathology image processing system 135). The subject-associated identifier can include an identifier of a subject, of a sample, of a section and/or of a digital pathology image. The subject-associated identifier can be provided by a user (e.g., a medical provider for and/or a physician of a subject). For example, the user can provide the identifier as input to a user device, which can transmit the identifier to the digital pathology image processing system 135.

At step 315, the digital pathology image processing system 135 can access one or more digital pathology images of a stained tissue sample associated with the identifier. For example, a local or remote data store can be queried using the identifier. As another example, a request that includes the identifier(s) can be transmitted to another system (e.g., a digital pathology image generation system), and a response can include the image(s). The image can depict a stained section of a sample from the subject. In particular embodiments, a first digital pathology image depicts a section stained with a first stain and a second digital pathology image depicts the section stained with a second stain. In particular embodiments, a single digital pathology image depicts a section stained with multiple stains. In particular embodiments, a digital pathology image can be separated into regions or tiles prior to or during the analytical process 300a. The separation can be based on user-indicated focus on a particular region, a detected region of interest (e.g., detected according to a rules-based on machine-learned manner, etc.).

At step 320, a first set of depictions of biological objects of a first type and a second set of depictions of biological objects of a second type can be detected from the digital pathology image(s). In particular embodiments, the first type of object can correspond to biological objects associated with a first stain, and the second type of object can correspond to biological objects associated with a second stain. The first type of objects can correspond to a first type of biological object (e.g., a first cell type), and the second type of objects can correspond to a second type of biological object (e.g., a second cell type).

Each biological object can be associated with location metadata that indicates where, within the digital pathology image(s) the object is depicted. The location metadata can include (for example) a set of coordinates corresponding to a point within the image, coordinates corresponding to an edge or border of the biological object depiction and/or coordinates corresponding to an area of the depicted object. For example, a detected biological object depiction can correspond to a 5×5 square of pixels within the image under analysis. Location metadata can identify all 25 pixels of the biological object depiction, 16 pixels along the border or a single representative point. The single representative point can be (for example) a midpoint or can be generated by calculating by pre-weighting each of the 25 pixels using an intensity value and then calculating a weighted center point. Other weighting measures, including content- or context-aware weighting measures can also be applied.

At step 325, a data structure is generated based on the biological object depictions detected at step 320. The data structure can include object information that characterizes the biological object depictions. For each detected biological object depiction, the data structure can identify, for example, a centroid of the biological object depiction, pixels corresponding to a perimeter of the biological object depiction, or pixels corresponding to an area of the biological object depiction. The data structure can further identify, for each biological object depiction, a type of biological object (e.g., lymphocyte, tumor cell, etc.) that corresponds to the depicted biological object.

At step 330, one or more spatial-distribution metrics are generated. The spatial distribution metric(s) characterize relative locations of the biological object depictions. In some cases, step 330 can include generating spatial distribution metric(s) based on the detected biological object depictions and object types of exemplary step 320. For example, a spatial-distribution metric can characterize how close and/or clustered depictions of objects of a particular type are relative to each other and/or relative to depictions of objects of another particular type.

At step 335, the spatial-distribution metric(s) generated at step 330 are output to a storage entity/database, a user interface, or a service platform. The service platform can provide further analyses using the output spatial-distribution metric(s). The spatial-distribution metric(s) can be transmitted to a user device (which can present the metrics to a user) and/or can be locally presented via a user interface. In particular embodiments, the image(s) and/or annotations corresponding to the detected biological object depictions are additionally output (e.g., transmitted and/or output).

In particular embodiments, the user can use the spatial-distribution metric(s) to inform a determination of a diagnosis, prognosis, treatment recommendation, or treatment eligibility determination for the subject. For example, immunotherapy and/or checkpoint immune therapy can be identified as a treatment recommendation when spatial-distribution metrics indicate that lymphocytes are close to and/or co-localized with tumor cells. It can be determined that lymphocytes are close to or interspersed with tumor cells when (for example) a metric representing distances between lymphocytes and tumor cells is similar to (e.g., less than 300%, less than 200%, less than 150% or less than 110%) a metric representing distances between a same-cell type (e.g., lymphocytes or tumor cells). It can be determined that lymphocytes are close to and/or interspersed with tumor cells when intensity values representing a quantity of each cell type assigned to individual regions within an image are similar. For example, an analysis can determine whether intensity values indicate that the cell types are densely located within a same or similar subset of image regions.

The user can provide the diagnosis, prognosis, etc., to the subject. For example, the diagnosis, prognosis etc., can be orally conveyed to the subject and/or transmitted from a device of the user to a device of the subject (e.g., via a secure portal). The user can further use a user device to update an electronic health record of the subject to include the diagnosis, prognosis, etc.

As a result of the recommendation, a treatment of the subject can be initiated, changed or halted. For example, a recommended treatment can be initiated, and/or an approved treatment of a particular disease can be initiated in response to diagnosing the subject with the particular disease.

FIG. 3B shows another process 300b for providing health-related assessments based on image processing of digital pathology images using spatial-distribution metrics according to some embodiments. Steps 305-330 of process 300b are largely similar to steps 305-330 of process 300a. However, particular embodiments, the digital pathology image processing system 135 can use the spatial-distribution metric(s) to predict a diagnosis, prognosis, treatment recommendation, or treatment eligibility determination for the subject (e.g., at step 347). The prediction can be generated using one or more rules that identify one or more thresholds and/or ranges for the metric(s). The prediction can include a result that represents the diagnosis, prognosis or treatment recommendation. The result can be (for example) a binary value (e.g., predicting whether the subject has a particular medical condition); a categorical value (e.g., predicting a tumor stage or identifying a particular treatment from among a set of potential treatments) or numeric (e.g., identifying a probability that the subject has a given condition, predicting a probability that a given treatment will slow progression of a disease and/or predicting a duration until a condition progresses to a next stage). The treatment recommendation can include using a checkpoint blockade therapy or immunotherapy (e.g., when metrics indicate that tumor cells are interspersed with lymphocytes).

The result can be generated by a trained machine-learning model, such as, by way of example and not limitation, a trained regression, decision-tree, or neural-network model. In particular embodiments, the spatial-distribution metrics include metrics of multiple different types, and the model is configured to process the multi-type data. For example, a set of metric types can include a metric defined based on a K-nearest-neighbor analysis; a metric defined based on Ripley's K-function; a Morisita-Horn index; a Moran's index; a metric defined based on a correlation function; a metric defined based on a hotspot analysis; and a metric defined based on a Kriging interpolation (e.g., ordinary Kriging or indicator Kriging), and the result can be generated based on metrics of at least two, at least three or at least four of the set of metric types.

At step 348, the digital pathology image processing system 135 can output the prediction (which can include outputting the result) to a storage entity/database, a user interface, or a service platform. For example, the prediction can be presented locally and/or transmitted to a user device (e.g., which can display or otherwise present the prediction). The digital pathology image processing system 135 can further output (and the user can further receive) the spatial-distribution metrics, the digital image(s) and/or annotation data that identifies the detected biological object depictions.

The user can then identify a confirmed diagnosis, prognosis, treatment recommendation, or treatment eligibility determination. The confirmed diagnosis, prognosis, etc. can match and/or correspond to the predicted diagnosis, prognosis, etc. The prediction (and/or other data) generated by the digital pathology image processing system can inform the user's decision as to which diagnosis, prognosis or treatment recommendation is identified. In particular embodiments, feedback can be provided from the user to the digital pathology image processing system that indicates whether the user-identified diagnosis, prognosis or treatment recommendation matches that of the prediction. Such feedback can be used to train a model and/or update rules that relate spatial-distribution metrics to prediction outputs.

FIG. 4 depicts various stages of identifying spatial-pattern and distribution metrics. For example, FIG. 4 shows an initial digital pathology image, results of detection of biological object depictions from the received image, a point process analysis of the image based on the detected biological object depictions, and a spatial distribution (depicted as a landmark assessment) showing the locations/intensity of the biological object depictions detected in the received image. The spatial distribution is depicted as a landmark assessment, and the objects detected are lymphocytes and tumor cells.

FIG. 4 shows an digital pathology image 405 of an exemplary stained section of a tissue biopsy of a subject. The tissue biopsy was collected, fixed, embedded and sectioned. Each section can be stained with H&E stain and imaged. The hematoxylin in the stain can stain certain cell structure (e.g., cell nuclei) a first color, and eosin in the stain stained the extracellular matrix and cytoplasm pink. The digital pathology image 405 was processed (using a deep neural network) to detect depictions of two types of objects: lymphocytes and tumor cells. Object data was processed in accordance with various image-processing frameworks and techniques (as noted below) to produce spatial-distribution metrics (as noted below).

Some embodiments include new and modified frameworks and metrics and new uses of frameworks and metrics for processing digital pathology images.

A table 410 depicted in FIG. 4 includes exemplary biological object data that identifies, for each of multiple biological object depictions: a subject identifier associated with the biological object, a type of stain used to stain a sample before imaging, a type of biological object (e.g., lymphocyte or tumor cell) and coordinates of a center of the biological object depiction in the digital pathology image. An object detector (e.g., biological object detector subsystem 145) was used to produce table 410, such that a single point location was identified for each biological object depiction. The single point location was defined to be a centroid point for the biological object depiction. A point-process analysis framework was conducted based on table 410.

A lymphocyte-point image 415a depicts lymphocyte point representations 417a at the tumor-cell coordinates for all detected lymphocyte depictions. A tumor-cell-point image 415b depicts point representations 417b at the point coordinates for all detected tumor-cell depictions.

Exemplary landscape representations 420a and 420b graphically illustrate three-dimensional landscape data for biological object feature types, in this case lymphocyte and tumor-cell feature types, respectively.

The three-dimensional landscape data for landscape representations 420a and 420b can be generated using point data for each of the two types of biological objects (e.g., as shown in table 410). An x-axis and y-axis of the landscape representation 420a can correspond to an x- and y-axis of (for example), image 405 and lymphocyte-point image 415a. In particular embodiments, an x-axis and y-axis of the landscape representation 420b can correspond to an x-axis and y-axis of digital image 405 and tumor-cell-point image 415b. The landscape data can further include z-values that characterize a computed quantity of biological object depictions of a given type detected within a region corresponding to (x,y) coordinates. Each (x,y) coordinate pair in the landscape data corresponds to a range of x-values and a range of y-values. Thus, the z-value can be determined based on a number of biological object depictions of a given type located across an area defined by the x-value range (corresponding to a portion of total width of the landscape) and y-value range (corresponding to a portion of a total length of the landscape).

The three-dimensional representation facilitates determining how a density of depictions of one type of biological object in a given portion of an image compares to a density of depictions of another type of biological object, in that heights of peaks can be visually compared. For example, landscape data can be generated for each of one or more types of biological objects, such as for lymphocytes and for tumor cells. Thus, a peak in lymphocyte landscape data can indicate a high number of lymphocytes in a region of a digital pathology image corresponding to a location of the peak, and a peak in tumor-cell landscape data can indicate a high number of tumor cells in a region of a digital pathology image corresponding to a location of the peak. Observing peaks of a first biological object type in comparison with peaks of a second biological object type can indicate a relationship between the biological object types and/or the depiction thereof. For example, observing tumor-cell landscape peaks that are at regions corresponding the regions with lymphocyte peaks can indicate that the tumor cells are interspersed with lymphocytes. For example, peak 425a of landscape representation 420a can correspond to peak 425b of landscape representation 420b; peak 430a can correspond with peak 430b. The peaks of landscape representation 420a and landscape representation 420b are generally at the same locations, thus indicating interspersion between the biological object types. A comparison of the peaks indicates less interspersion at the location of peak 425a and peak 425b, when compared to the interspersion at the location of peak 430a and peak 430b. In some cases, the digital pathology location corresponding to the location of peak 430a and peak 430b can then be of interest, and a prompt to collect more digital pathology image data or additional biological samples corresponding to that image location can be generated.

Ripley's K function can be used as an estimator for detecting deviations from spatial homogeneity in a set of points (e.g., points corresponding to the point-representative image location of biological object depictions) and can be used to assess the extent of spatial clustering or dispersion at many distance scales. The K function (or more particularly its sample-based estimate) can be defined as:

$$\hat{K}(r) = \lambda^{-1} \sum_{i \neq j} \frac{w_{ij} * I(d_{ij} \leq r)}{n}$$

where $d_{ij}$ denotes the pairwise Euclidean distance of $i_{th}$ and $j_{th}$ among the total n biological object depictions; r is the search radius, $\lambda$ is the average density of biological object depictions (e.g., n/A, where A is the area of the tissue that encompasses all the biological object depictions; I(•) is the indicator function with 1 when $d_{ij} \leq r$ and $w_{ij}$ is the edge correction function to avoid biased estimation due to edge correction function to avoid biased estimation due to edge effects.

To design efficient machine learning schemes, the entire K-function can be summarized by formulating the following metrics:
1. Area Under Curve: a clinically meaningful maximum value of the biological object-to-biological object distance r, $r_{max}$ is identified and the area between observed and theoretical (e.g., under a null hypothesis which assumes biological objects of the same or of different types are spatially independent) K-function for $0 \leq r \leq r_{max}$ can be computed.
2. The point estimates of difference between observed and theoretical Ripley's K function at $r = r_{max}$.

The above features can be derived for biological objects of a first type and biological objects of a second type (e.g., tumor cells and lymphocytes), separately. In addition, cross-type Ripley's K function can be derived in a similar manner. Using the Ripley's K function, the extent of spatial clustering or dispersion of biological objects can be estimated and output to provide for an understanding of this clustering among the depictions of biological objects (e.g., indicating infiltration or separation of biological objects of a first type with biological objects of a second type).

To identify nearest-neighbor metrics, distances between locations of various pairs of detected biological object depictions can be determined. Each distance can be calculated for each pair of biological object depictions of different types (e.g., between each tumor-cell/lymphocyte pair). With respect to a given biological object depiction (e.g., a depiction of an individual lymphocyte), a subset of nearest-neighbor object depictions can be defined to be those that are identified as being of a given type and that are depicted as being closest to a depiction of given biological object. For example, for a given lymphocyte, a nearest-neighbor subset can identify n tumor cells that are depicted closest to the given lymphocytes relative to other tumor cells depicted in an image, where n can be a programmable, user-directed, or machine-learned value. For each subset, a centroid of the locations of the subset's biological object depiction locations can be calculated. A nearest-neighbor distance metric between the centroid and the location of the depiction of the given biological object can be determined therefrom.

Figure 5A:
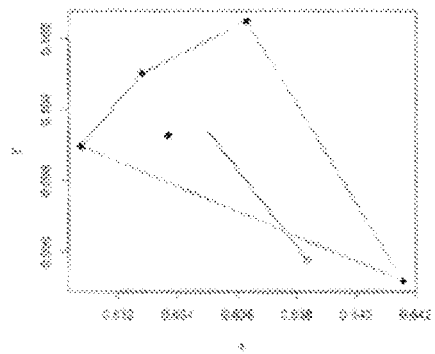
FIGS. 5A-5C illustrate exemplary processing images using a discrimination-based spatial-point-process analysis framework according to some embodiments.
Figure 5B:
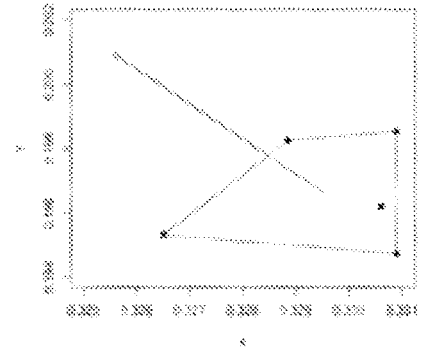

FIGS. 5A and 5B illustrate two exemplary nearest-neighbor subsets. A location of an exemplary biological object depiction is represented in each of FIGS. 5A and 5B by the open-circle data point. For each biological object depiction (e.g., lymphocyte), one or more nearest-neighbor biological object depictions of a second type (e.g., a predefined number of nearest-neighbor tumor biological object depictions) can be identified. In the depicted example, five other nearest-neighbor biological object depictions were identified. The locations of these nearest neighbors are represented in FIGS. 5A and 5B by filled data points. A centroid of the nearest neighbors can be calculated for the nearest-neighbor locations. The midpoint can be calculated for example, as a mean, median, weighted mean, center of mass, etc., for the nearest-neighbor locations. In the depicted example, the centroid location is represented by the position of the end of the line extending from the open circle. A nearest-neighbor distance metric between the location of the exemplary biological object and the centroid is represented in FIGS. 5A-5B by the line extending from the open circle.

Figure 5C:
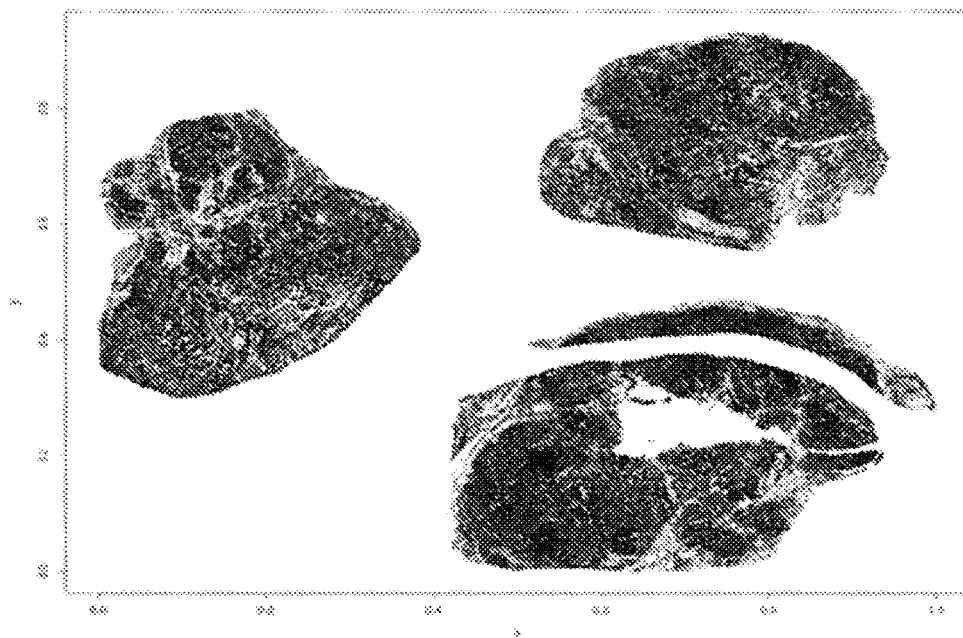

Thus, for a given biological object, a nearest-neighbor distance metric can be calculated for the nearest-neighbor subset of biological objects of a second type. The distance metric can be used to classify the biological object. As an example, where the first biological object is a lymphocyte and the nearest-neighbor biological objects are tumor cells, the classification can be as being an adjacent-tumor lymphocyte or an intra-tumor lymphocyte. The classification can be based on learned or rules-based assessments of the nearest neighbor distance. For example, the lymphocyte can be classified as an adjacent-tumor lymphocyte when the distance metric exceeds a threshold and classified as an intra-tumor lymphocyte when the distance metric does not exceed the threshold. The threshold can be fixed or defined based on distance metrics associated with one or more digital pathology images. In particular embodiments, the threshold can be calculated by fitting a 2-component Gaussian-mixture model to the distance metrics associated with all biological objects depicted in a digital pathology image. FIG. 5C depicts exemplary characterizations of biological objects according to this discrimination analysis and dependent of on the context of the process (e.g., the identity of the biological object depictions, the number of biological object depictions, the identity of the biological object depiction types, the number of biological object depiction types, the absolute and relative values of the nearest neighbor distances, etc.). In the example illustrated in FIG. 5C, black points represent tumor cell depictions. Blue points represent lymphocyte depictions classified as being intra-tumor lymphocytes. Green points represent lymphocyte depictions classified as being adjacent-tumor lymphocytes.

The cross-type pair correlation function (PCF-cross) is another statistical measurement of the spatial dependence between points (e.g., points corresponding to the point-representative image location of biological object depictions) in a spatial point process. In particular embodiments, the PCF-cross function can quantify how biological object depictions of a first type (e.g., lymphocytes) are surrounded by biological object depictions of a second type (e.g., tumor cells). PCF-cross can be expressed as:

$$\hat{g}(r) = \frac{\lambda^{-1}}{2\pi r} \sum_{i \neq j} \frac{w_{ij} * k_h(r - d_{ij})}{n}$$

where $\lambda$, $\omega_{ij}$ and $d_{ij}$ are similarly defined as Ripley's K function, and $k_h(\bullet)$ is the smoothing kernel with smoothing bandwidth h>0.

The entire PCF-cross can be summarized by formulating the following metrics:
1. Area Under Curve: a clinically meaningful maximum value of the biological object-to-biological object distance r, $r_{max}$ can be chosen and the area between observed and theoretical (e.g., under a null hypothesis which assumes biological objects of the same or of different types are spatially independent) PCF-cross for 0≤r≤rmax was computed.
2. The point estimates of difference between observed and theoretical PCF-cross at $r=r_{max}$.

Mark correlation function (MCF) facilitates determining whether locations of biological object depictions are more or less similar than expected in relation to locations of biological object depictions (e.g., of a different type) nearby, or whether the locations are independent (e.g., random) from the biological object depictions of the second type. In other words, whether the location and presence of biological object depictions of the second type influence the location and presence of biological object depictions of the first type. The mark correlation function can be defined as:

$$\hat{\zeta}_r(r) = \frac{\hat{E}(s_i, s_j)(I(M(s_i), M(s_j)))}{\hat{E}(I(M, M'))}$$

where $\hat{E}(s_i, s_j)$ denotes the empirical conditional expectation given that there are biological object depictions at the digital pathology image locations $s_i$ and $s_j$ separated by a distance r, $M(s_i)$, $M(s_j)$ denote the biological object type associated with these two biological object depictions. On the denominator, M, M' are biological object types randomly and independently drawn from the their marginal distribution; I(m1;m2) is defined as 1 when m1==m2.

The entire MCF was summarized by formulating the following metrics:
1. Area Under Curve: a clinically meaningful maximum value of the biological object-to-biological object distance r, $r_{max}$ was chosen and the area between observed and theoretical (e.g., under a null hypothesis which assumes biological objects of the same or of different types are spatially independent) MCF for 0≤r≤$r_{max}$ was computed.
2. The point estimates of difference between observed and theoretical MCF at $r=r_{max}$.

A further assessment of the biological object depictions can be based on a comparison of the prevalence of biological object depictions of one or more types. For example, a feature can be derived from comparisons of the amounts of biological object depictions of a first type to biological object depictions of a second type. Furthermore, the feature can be enhanced by comparison of biological object depictions (e.g., of the first type or the second type) having particular classifications.

For example, a categorization of depictions of lymphocytes based on statistical analysis of tumor spatial heterogeneity can be characterized by an intra-tumor lymphocyte ratio (ITLR), which can characterize lymphocyte depiction position in relation to tumor cell density. In some embodiments, the assessment can be guided by the use of digital pathology image annotations, such as annotated of areas of interest (e.g., tumor areas). Within each of these areas, each lymphocyte depiction can be characterized as being an adjacent-tumor lymphocyte or intra-tumor lymphocyte based on Euclidean distance measurements (as described herein). The nearest n tumor cells can be identified for each lymphocyte depiction (e.g., using a nearest-neighbor technique, such as a technique described in Section VI.A.3). Where n is a definable parameter for the number of neighbors to used. Secondly, the centroid coordinates of the convex hull region formed by the n nearest tumor cell depictions can be derived. The distance from each lymphocyte depiction to the nearest tumor cell depiction and to the centroid of the convex hull can then be computed, and a two-component Gaussian mixture model can be fitted to further discriminate the lymphocytes into adjacent-tumor lymphocyte or intra-tumor lymphocyte. If a lymphocyte has infiltrated into the tumor core region, the distance to the centroid should be small. By contrast, if the lymphocyte is still in the movement to the tumor core region, the distance is likely larger. The ITLR feature was defined to be:

$$ITLR = \frac{N_{intra-tumor\ lymphocyte}}{N_{tumor\ cell}}$$

where $N_{intra-tumor\ lymphocyte}$ denotes the total number of intra-tumor lymphocytes; and $N_{tumor\ cell}$ denotes the total number of tumor cells. Although described in the context of a particular classification of particular biological object types, the BOR can be extended using similar principles to other biological object depictions having their own context-dependent characterizations.

The G-cross function computes the probability distribution of the distance from a biological object depiction of a first type to the nearest biological object depiction of a second type within any given distance. Specifically, the G-cross function can be considered a spatial distance distribution metric that represents the probability of finding at least one biological object depiction (e.g., of a specified type) within a r radius circle centered at a given point (e.g., the point location representation of a biological object depiction in the digital pathology image). These probability distributions can be applied to quantify relative proximity of any two types of biological object depictions. Therefore, for example, the G-cross function can be a quantitative surrogate of infiltration determination. Mathematically, the G-cross function is expressed as follows:

$$\hat{G}(r) = \sum_i \frac{I(d_i \leq r)}{n_{lym}}$$

where $d_i = \min_j \{d_{ij}, \forall j \neq i\}$, j denotes the index of biological object depictions of a first type; I(•) is the indicator function with 1 when $d_i \leq r$; $n_{lym}$ is the total number of biological objects.

Similarly, the entire G-cross function can be summarized by formulating the following metrics:
1. Area Under Curve: a clinically meaningful maximum value of the biological object-to-biological object distance distance r, $r_{max}$ was chosen and the area between observed and theoretical (e.g., under a null hypothesis which assumes biological objects of the same or of different types are spatially independent) G-cross function for $0 \leq r \leq r_{max}$ was computed.
2. The point estimates of difference between observed and theoretical G-cross function at $r = r_{max}$.

Figure 6A:
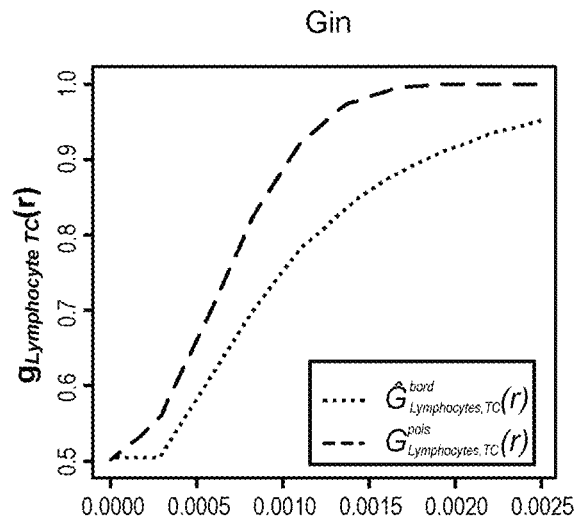
FIGS. 6A-6D illustrate exemplary distance- and intensity-based metrics characterize spatial arrangements of object depictions in an exemplary image according to some embodiments.
Figure 6B:
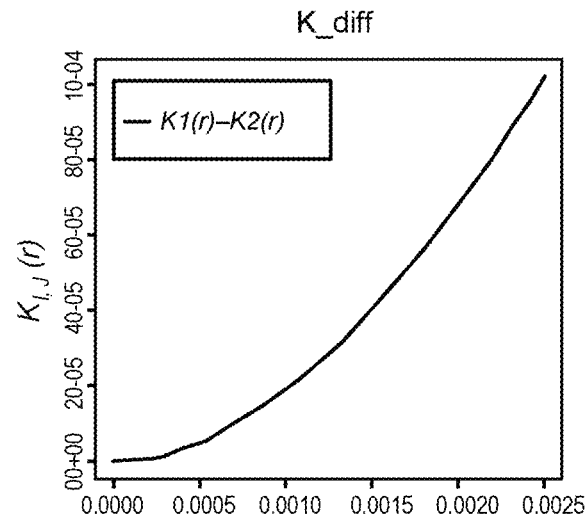
Figure 6C:
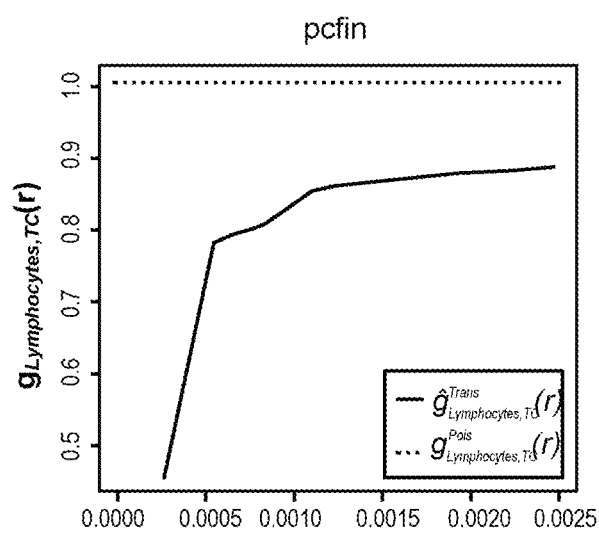
Figure 6D:
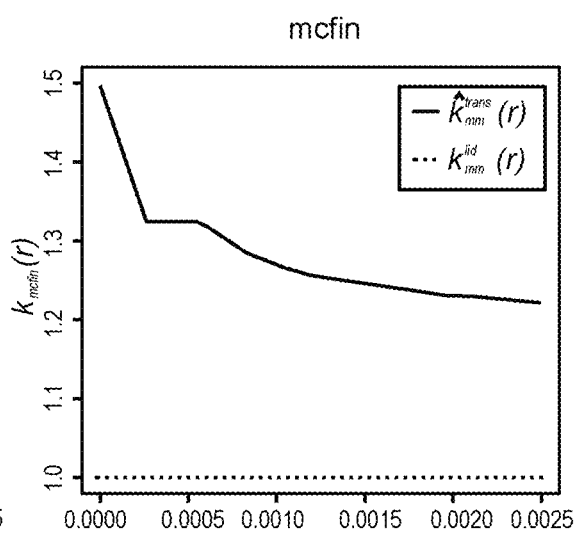

FIGS. 6A-6D illustrate exemplary distance- and intensity-based metrics that characterize spatial arrangements of biological object depictions in an exemplary digital pathology image according to some embodiments. For each of four types of spatial feature metrics derived based on digital pathology images, statistical values are shown plotted across a range of r values. FIG. 6A shows the G-cross function for the observed G-cross function calculated from the sample (narrow dashed line) and the theoretical G-cross function under the null hypothesis that assumes biological objects of a first type and biological objects of a second type are spatially independent (wide dashed line). The G-cross function can be calculated as described herein. FIG. 6B shows the difference between the K-function calculated for biological object depictions of a first and the K-function calculated for biological object depictions of a second type (solid line). The K-functions were calculated as described herein. FIG. 6C shows the cross-type pair correlation function calculated under the null hypothesis that assumes biological objects of a first type and biological objects of a second type are spatially independent (dotted line) or by comparing positions of depicted biological objects of the first type to depicted biological objects of the second type (solid line). The pair correlation was calculated as described herein. FIG. 6D shows the Mark correlation function calculated under the null hypothesis that assumes biological objects of a first type and biological objects of a second type are spatially independent (dotted line) or by comparing positions of depicted biological objects of the first type to depicted biological objects of the second type (solid line). The Mark correlation was calculated as described herein.

The plots in FIGS. 6A-6D illustrate that, for this example, the biological object depictions of the first type and second type are spatially correlated based on the objective measures. Further quantitative features can be derived based on algorithms disclosed herein.

Figure 7:
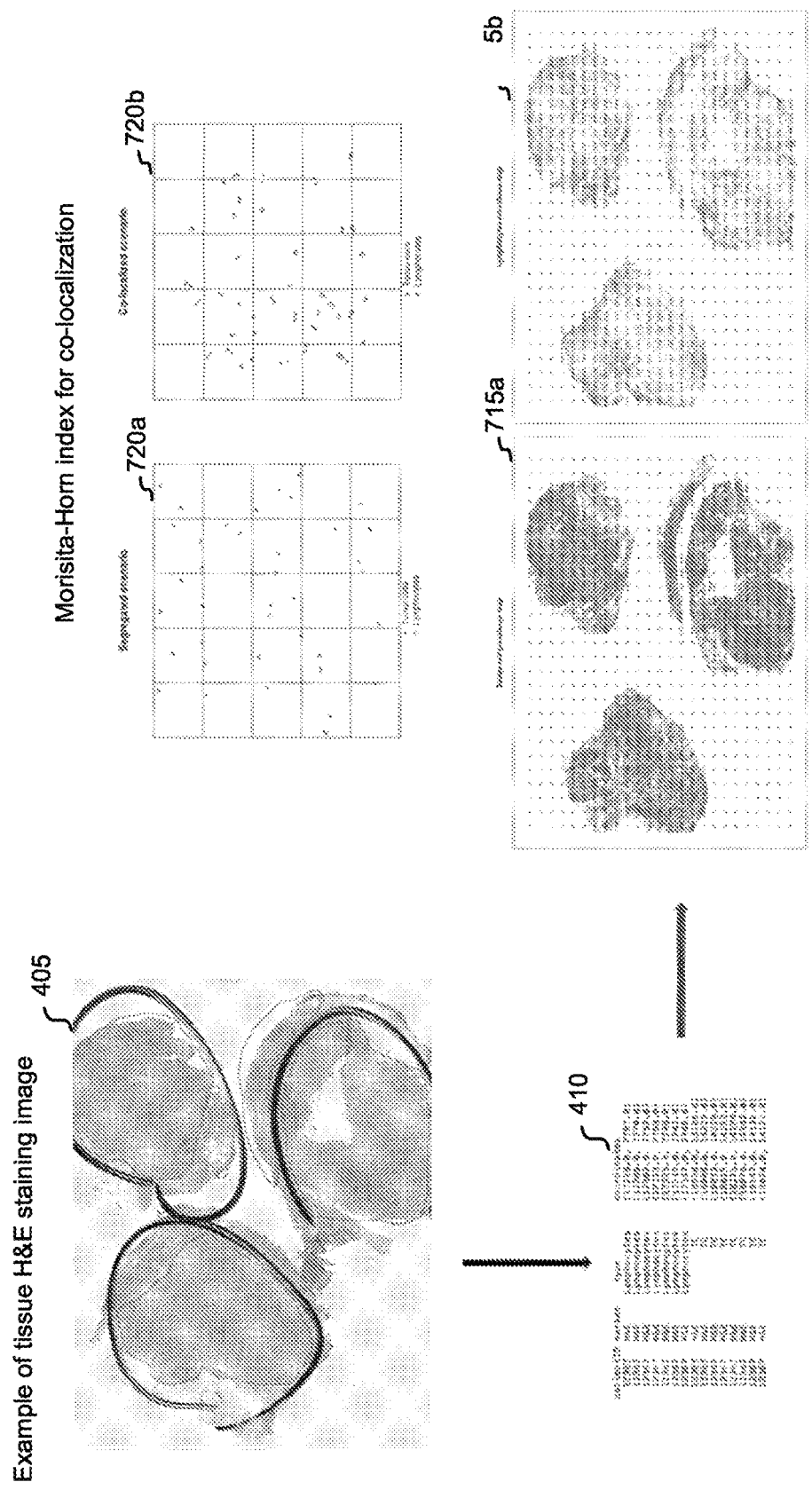
FIG. 7 illustrates a process for processing images using a lattice-based spatial-areal analysis framework according to some embodiments.

FIG. 7 depicts an application of an areal analysis framework 230. In particular, an areal analysis framework 230 was used to process a digital pathology image 405 of a stained sample section. Depictions of particular types of biological objects (e.g., lymphocytes and tumor cells) were detected, as described above in relation to the spatial-point-process analysis framework. The areal analysis framework 230 further produces biological object data, an example of which is shown in table 410.

A spatial lattice having a defined number of columns and a defined number of rows can be used to divide the digital pathology image 405 into region. As an example, shown in FIG. 7, a spatial lattice was used to divide the digital pathology image 405 into 22 columns and 19 rows. The spatial lattice includes 418 regions. Each biological object depiction can be assigned to a region. In particular embodiments, the region can be the region containing a midpoint, or other representation point, of the biological object depiction. For each biological object type and for each lattice region, a number of biological object depictions of the biological object type that were assigned to the region can be identified. For each biological object type, the collection of region-specific biological object counts can be defined to be the biological object type's lattice data. FIG. 7 illustrates a particular embodiment of lattice data 715a for depictions of a first type of biological object and lattice data 715b for depictions of a second type of biological object, each being overlaid on a representation of the digital pathology image 405 of the stained section. Lattice data can be defined to include, for each region in the lattice, a prevalence value defined to equal counts for the region divided by total counts across all regions. Thus, regions within which there are no biological objects of a given type will have a prevalence value of 0, while regions within which there is at least one biological object of a given type will have a positive non-zero prevalence value.

Identical amounts of biological objects (e.g., lymphocytes) in two different contexts (e.g., tumors) do not imply the characterization or degree of characterization (e.g., the same immune infiltration). Instead, how the biological object depictions of a first type are distributed in relation to biological object depictions of a second type can possibly indicate a functional state. Therefore, characterizing proximity of biological object depictions of the same and different types can reflect more information. The Morisita-Horn Index is an ecological measure of similarity (e.g., overlap) in biological or ecological systems. In particular embodiments, the Morisita-Horn index (MH) to characterize the bi-variate relationship between two populations of biological object depictions (e.g., of two types) can be defined as:

$$MH = \frac{2\sum_i^n z_i^l z_i^t}{\sum_i^n (z_i^l)^2 + \sum_i^n (z_i^t)^2}$$

where $z_i^l$, $z_i^t$ denotes the prevalence of biological object depictions of a first type and biological object depictions of a second type at the square grids i, respectively. In FIG. 7, lattice data 715a shows exemplary prevalence values $z_i^t$ of depictions of a first type of biological object across grid points, and lattice data 715b shows exemplary prevalence values $z_i^l$ of depictions of a second type of biological object of the across grid points.

The Morisita-Horn Index is defined to be 0 when individual lattice regions do not include biological object depictions of both types (indicating that the distributions of different biological object types are spatially separated). For example, the Index would be 0 when considering the illustrative spatially separate distributions shown in illustrative first lattice data 720a. The Morisita-Horn Index is defined to be 1 when a distribution of a first biological object type across lattice regions matches (or is a scaled version of) a distribution of a second biological object type across lattice regions. For example, the Index would be close to 1 when considering the illustrative highly co-localized distributions shown in illustrative second lattice data 720b.

In the example illustrated in FIG. 7, the Morisita-Horn Index calculated using lattice data 715a and lattice data 715b was 0.47. The high Index value indicates that the depictions of biological objects of the first type and second type were highly co-localized.

Jaccard index (J) and Sorensen index (L) are similar and closely related to each other. In particular embodiments, they can be defined as:

$$J = \frac{\sum_i^n \min(z_i^l, z_i^t)}{\sum_i^n (z_i^l + z_i^t) - \sum_i^n \min(z_i^l, z_i^t)}$$

$$L = \frac{2\sum_i^n \min(z_i^l, z_i^t)}{\sum_i^n (z_i^l + z_i^t)}$$

where $z_i^l$, $z_i^t$ denotes the prevalence of biological object depictions of a first type and biological object depictions of a second type at the square grids i, respectively, min(a, b) returns the minimum value between a and b.

In particular embodiments, another metric that can characterize a spatial distribution of biological object depictions is Moran's Index, which is a measure of spatial autocorrelation. Generally, Moran's Index statistic is the correlation coefficient for the relationship between a first variable and a second variable at neighboring spatial units. In particular embodiments, the first variable can be defined as prevalence of depictions of biological objects of a first type and the second variable can be defined as prevalence of depictions of biological object of a second type, so as to quantify the extent to which the two types of biological object depictions are interspersed in digital pathology images. In some embodiments, a Moran's Index, I, can be defined as:

$$I = \frac{n}{\sum_i^n \sum_j^n w_{ij}} \left( \sum_i^n \sum_j^n w_{ij}(x_i)(y_j) \right)$$

where $x_i$, $y_j$ denotes the standardized prevalence of biological object depictions of the first type (e.g., tumor cells) at areal unit i, and the standardized prevalence of biological object depictions of the second type (e.g., lymphocytes) at areal unit j. The $\omega_{ij}$ is the binary weight for areal unit i and j, a weight is 1 if two units neighbor, and 0 otherwise, a first-order scheme can be used to define neighborhood structure. Moran's I can be derived separately for biological object depictions of different types of biological objects.

Figure 8:
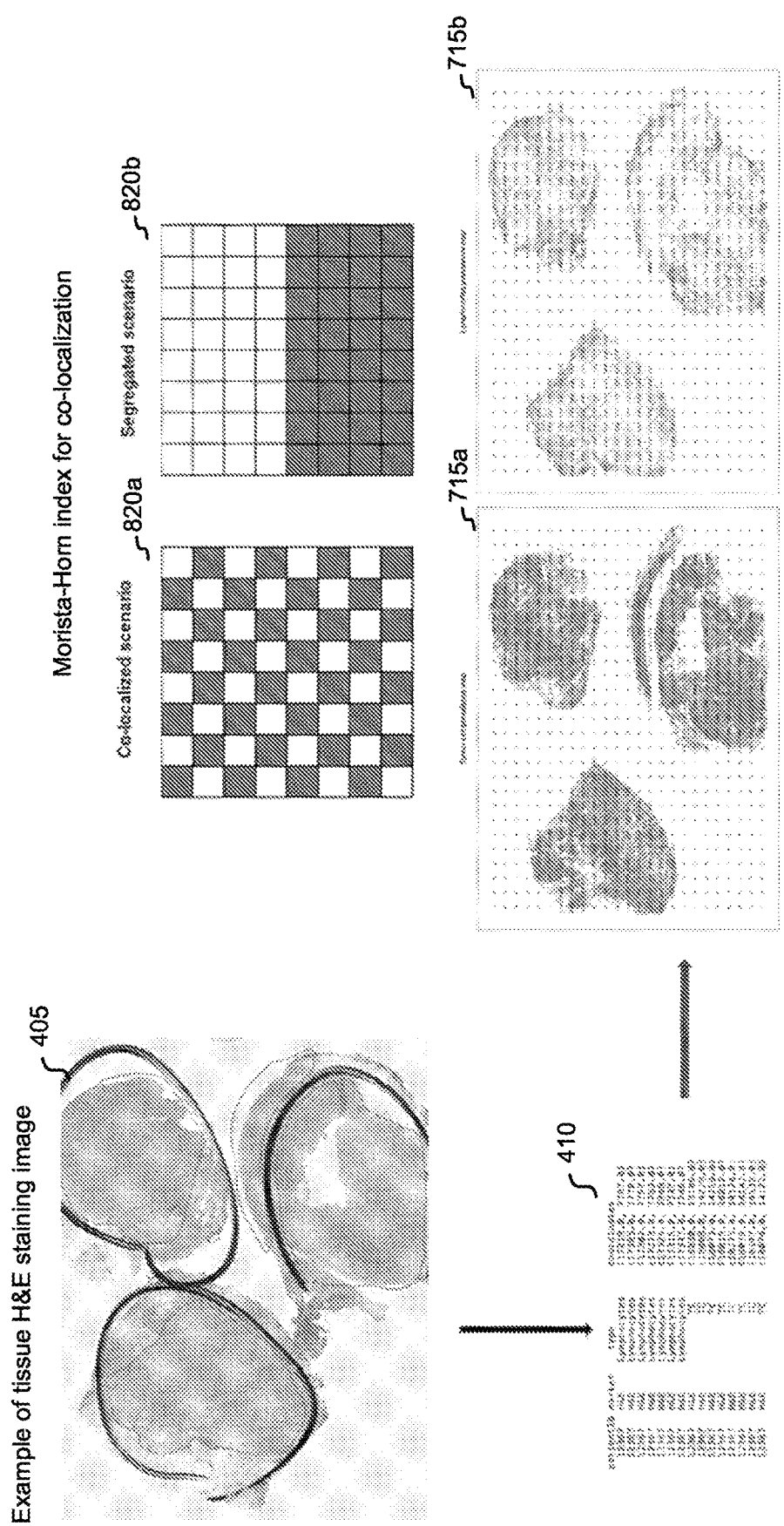
FIG. 8 illustrates a process for processing images using a Moran's Index according to some embodiments.

As illustrated in FIG. 8, Moran's Index is defined to be equal to −1 when biological object depictions are perfectly dispersed across a lattice (and thus having a negative spatial autocorrelation; "co-localized scenario" 820a); and to be 1 when biological object depictions are tightly clustered (and thus having a positive autocorrelation; "segregated scenario" 820b). Moran's Index is defined to be 0 when an object distribution matches a random distribution. The areal representation of particular biological object depiction types thus facilitates generating a grid that supports calculation of an Moran's Index for each biological object type.

The Moran's Index calculated using lattice data 715a was 0.50. The Moran's Index calculated using lymphocyte lattice data 715b was 0.22. A difference between the Moran's Index calculated for each of the two type of biological object depictions can provide an indication of colocation (e.g., with differences near zero indicating colocation).

Geary's C, also known as Geary's contiguity ratio, is measure of spatial autocorrelation or an attempt to determine if adjacent observations of the same phenomenon are correlated. Geary's C is inversely related to Moran's I, but it is not identical. While Moran's I is a measure of global spatial autocorrelation, Geary's C is more sensitive to local spatial autocorrelation.

$$C = \frac{n-1}{2\sum_i^n \sum_j^n w_{ij}} \frac{\sum_i^n \sum_j^n w_{ij}(z_i - z_j)^2}{\sum_i^n (z_i - \bar{z})^2}$$

where $z_i$ denotes the prevalence of either biological object depictions of a first type or a second type at the square grids i, $\omega_{i,j}$ is the same as defined aforementioned.

Figure 9:
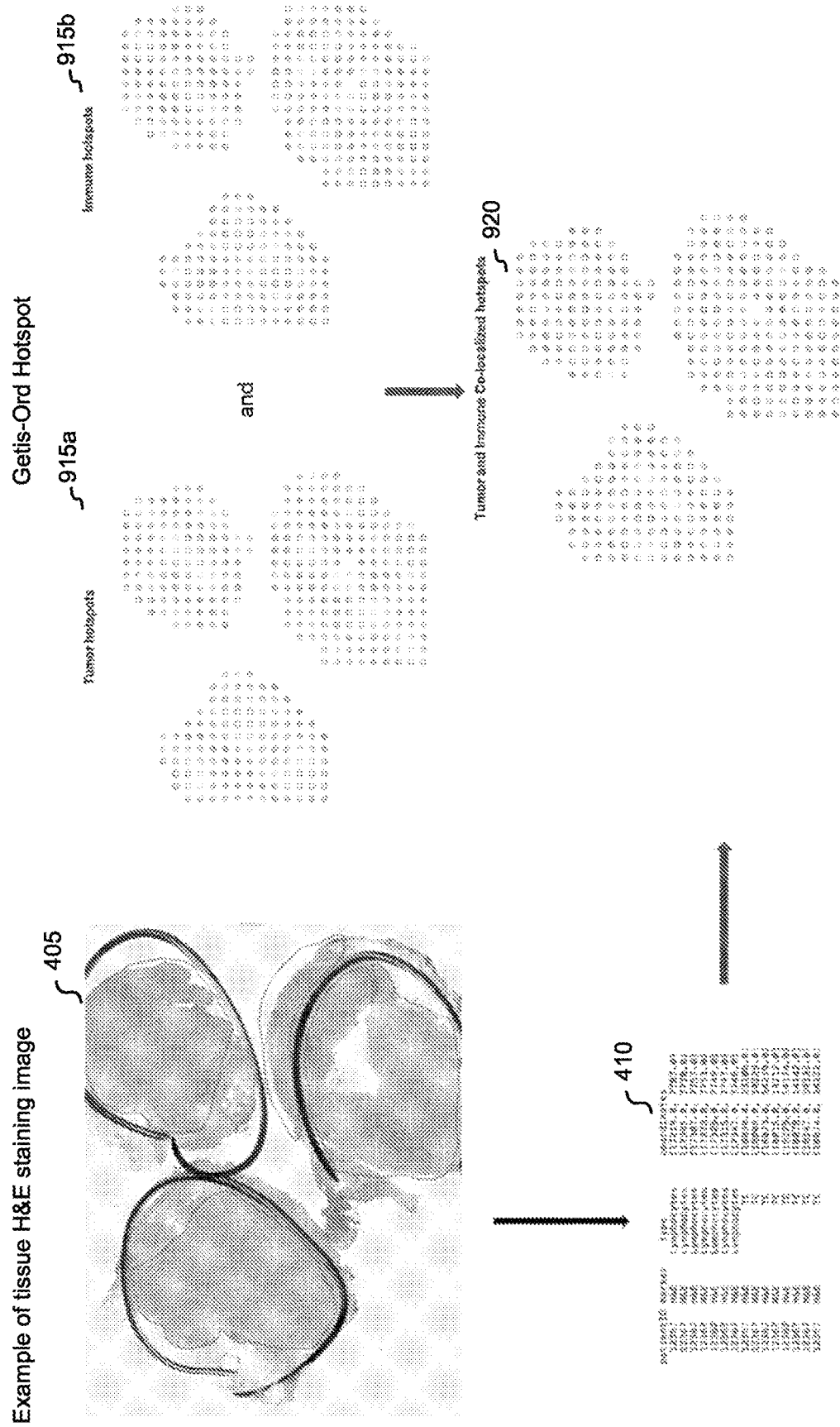
FIG. 9 illustrates a process for processing images using a hotspot-based spatial-areal analysis framework according to some embodiments.

In particular embodiments, lattice data 715a and lattice data 715b can be further processed to generate hotspot data 915a corresponding to detected depictions of a first type of biological object and hotspot data 915b corresponding to detected depictions of a second type of biological object, respectively. In FIG. 9, hotspot data 915a and hotspot data 915b indicate the regions that were determined to be hotspots for the respective types of detected depictions of biological objects. The regions that were detected as hotspots are shown as red symbols and the regions that were determined not to be hotspots as black symbols. Hotspot data 915a, 915b was defined for each region associated with a non-zero object count. Hotspot data 915a, 915b can also include binary values that indicate whether a given region was identified as being a hotspot or not. In addition to hotspot data and analysis, coldspot data and analysis can be conducted.

With respect to depictions of biological objects, hotspot data 915a, 915b can be generated for each biological object type by determining a Getis-Ord local statistic for each region associated with a non-zero object count for the biological object type. Getis-Ord hotspot/coldspot analysis can be used to identify statistically significant hotspots/coldspots of tumor cells or lymphocytes, where hotspots are the areal units with a statistically significantly high value of prevalence of depictions of biological objects compared to the neighboring areal units and coldspots are the areal units with a statistically significantly low value of prevalence of depictions of biological objects compared to neighboring areal units. The value and determination what makes a hotspot/coldspot region compared the neighboring regions can be selected according to user preference, and, in particular embodiments, can be selected according to a rules-based approach or learned model. For example, the number and/or type of biological object depictions detected, the absolute number of depictions, and other factors can be considered. The Getis-Ord local statistic is a z-score and can be defined, for a square grid i, as:

$$G_i^* = \frac{\sum_{j=1}^n \omega_{i,j} z_j - \bar{z} \sum_{j=1}^n \omega_{i,j}}{S\sqrt{\frac{n\sum_{j=1}^n \omega_{i,j}^2 - \left(\sum_{j=1}^n \omega_{i,j}\right)^2}{n-1}}}$$

where i represents an individual region (specific row-column combination) in the lattice, n is the number of row and column combinations (i.e., number of regions) in the lattice, $\omega_{i,j}$ is the spatial weight between i and j, and $z_j$ is the prevalence of biological object depictions of a given type in a region, $\bar{z}$ is the average object prevalence of the given type across regions, and:

$$S = \sqrt{\frac{\sum_{j=1}^n z_j^2}{n} - (\bar{z})^2}$$

In particular embodiments, the Getis-Ord local statistics can be transformed to binary values by determining whether each statistic exceeds a threshold. For example, a threshold can be set to 0.16. The threshold can be selected according to user preference, and in particular embodiments, can be set according to rule-based on machine-learned approaches.

In particular embodiments, a logical AND function can be used to identify the regions that are identified as being a hotspot for more than one type of depictions of biological objects. For example, co-localized hotspot data 920 indicates the regions that were identified as being a hotspot for two types of biological object depictions (shown as red symbols). A high ratio of a number of regions identified as being a co-localized hotspot relative to a number of hotspot regions identified for a given object type (e.g., for tumor-cell objects) can indicate that biological object depictions of the given type share spatial characteristics with the other object type. Meanwhile, a low ratio at or near zero can be consistent with spatial segregation of biological objects of the different types.

Geostatistics is a corpus of mathematical/statistical methods that were developed originally to predict probability distributions of a spatial stochastic process for mining operations. Geostatistics is widely applied in diverse disciplines including petroleum geology, earth and atmospheric sciences, agriculture, soil science, and environmental exposure assessment. In the realm of geostatistics, a variogram can be used to describe the spatial continuity of the data. To generate features from fitting the variogram, firstly, the empirical variogram can be calculated as a discrete function using the measure of variability between pairs of points (e.g., representative locations of biological object depictions) separated by various distances. Secondly, the theoretic variogram can be fitted upon the estimation of empirical variogram. In particular embodiments, the Matern function can be used as the theoretic variogram model. Consider a spatial model $\{Z(s):s \in D\}$, where $Z(s)$ is the prevalence of tumor cells or lymphocytes at location s, D denotes the set of sample points s1, s2, ..., sn. The empirical variogram can be calculated as follows:

$$\hat{\gamma}(h) = \frac{1}{2*N(h)} \sum_{(s_i,s_j)|h_{(s_i,s_j)}=h} [Z(s_i) - Z(s_j)]^2$$

Figure 10:
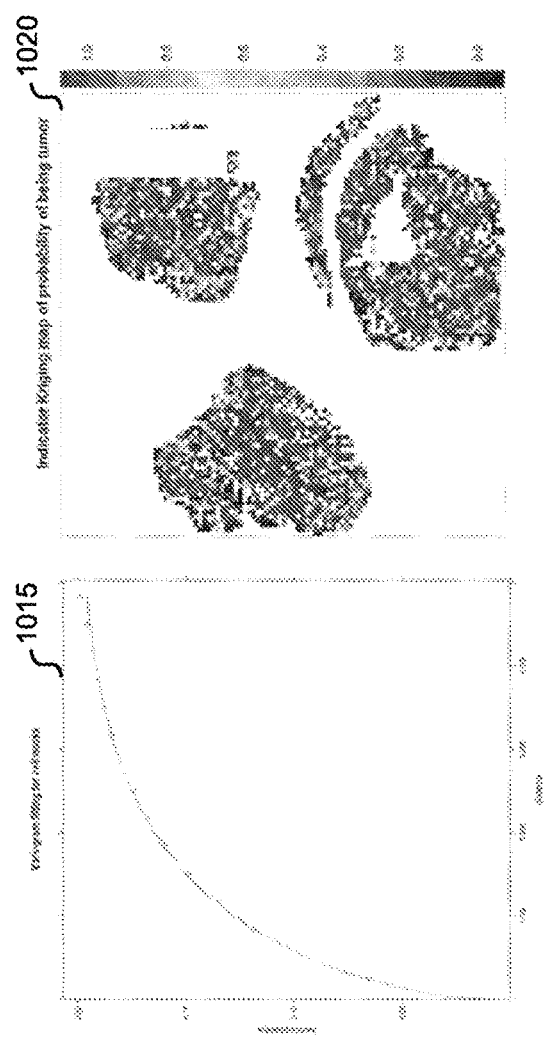
FIG. 10 illustrates a process for processing images using a geostatistical analysis framework according to some embodiments.
Figure 10:
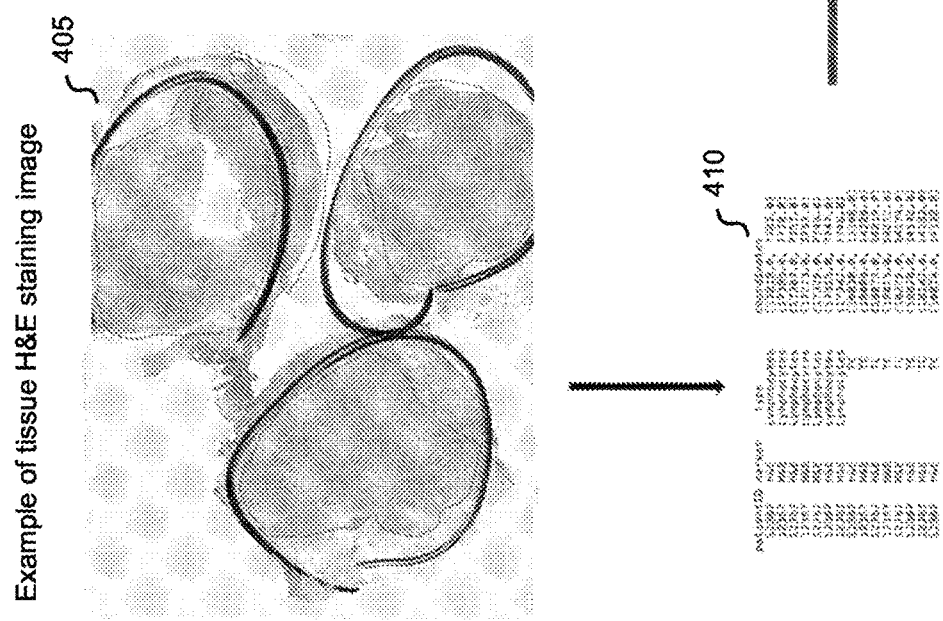

In the example of FIG. 10, an empirical variogram was generated based on depictions of biological objects detected in H&E staining image 405 (shown in FIG. 10 as the points of the theoretic variogram plot). A theoretic variogram 1015 was then generated by fitting a Matern function to the empirical variogram.

In the above calculations, the summation is over only the N(h) pairs of observations (e.g., pairs of depictions of biological objects) which are separated by Euclidean distance h. The parameters from the Matern function can be used as the feature from this method. The features can be obtained from variogram fitting of detected depictions of biological objects of a first type (e.g., tumor cells) and detected depictions of biological objects of a second type (e.g., lymphocytes), separately. Alternatively, indicator variogram fitting can also be conducted when combining the detected depictions of biological objects across types.

The variograms and point locations of detected depictions of biological objects estimate can then be used to generate, for each region (e.g., pixel) of the digital pathology image 405, a probability that a particular type of biological object is depicted at the region. Kriging map 1020 depicted in FIG. 10 shows, for each of multiple regions in digital pathology image 405, a probability that a particular type of biological object (e.g., a tumor cell) is depicted at the region.

In particular embodiments, a regression machine-learning model can be trained to process a digital pathology image, e.g., of a biopsy section from a subject, to predict an assessment of a condition of the subject from the digital pathology image. As an example, a regression machine-learning model can be trained predict, based on a digital pathology image of a biopsy section from a subject diagnosed with colorectal cancer whether the cancer exhibits microsatellite stability in tumor DNA (versus microsatellite instability in tumor DNA). Microsatellite instability can be associated with a relatively high number of mutations within microsatellites.

A biopsy can be collected from each of multiple subjects having the condition, in this example, colorectal cancer. The sample can be fixed, embedded, sliced, stained and imaged according to the subject matter disclosed herein. Depictions of specified types of biological objects, e.g., tumor-cell and lymphocyte biological object depictions, can be detected, using, for example, a biological object detector sub-system 145. In particular embodiments, the biological object detector sub-system 145 can use a trained deep convolutional neural network to recognize and identify depictions of biological objects. For each subject of the multiple subjects, a label can be generated so as to indicate whether the condition (e.g., cancer) exhibited specified features (e.g., microsatellite stability versus microsatellite instability). Ground-truth labels can be generated based on pathologist assessment and assay-based test results.

For each subject, an input vector can be defined to include a set of spatial-distribution metrics. The set of spatial-distribution metrics can include a selection of the metrics described herein. As an example, metrics to be included in the input vector can include:

Area between the observed and theoretical K-function for biological object-to-biological object distances ranging from 0 to a maximum observed distance;

Point estimates of the difference between the observed and theoretical Ripley's K function at a maximum biological object-to-biological object distance;

Area under the curve of the G-cross function for biological object-to-biological object distances ranging from 0 to a maximum observed distance;

Point estimates of the difference between the observed and theoretical G-cross function at a maximum biological object-to-biological object distance;

Area under the curve of the pair correlation function (cross-type) for biological object-to-biological object distances ranging from 0 to a maximum observed distance;

Point estimates of the difference between the observed and theoretical pair correlation function (cross-type) at a maximum biological object-to-biological object distance;

Area under the curve of the Mark correlation function (cross-type) for biological object-to-biological object distances ranging from 0 to a maximum observed distance;

Point estimates of the difference between the observed and theoretical Mark correlation function (cross-type) at a maximum biological object-to-biological object distance;

Intra-tumor lymphocyte ratio;

Morisita-Horn Index;

Jacard Index;

Sorensen Index;

Moran's Index;

Geary's C;

The ratio of co-localized spots (e.g., hotspots, coldspots, non-significant spots) for the type of biological object depictions over the number of spots (e.g., hotspots, coldspots, non-significant spots) for a first type of the biological object depictions, with spots (e.g., hotspots, coldspots, non-significant spots) defined using Getis-Ord local statistics; and Features obtained by variogram fitting of two types of biological object depictions (e.g., tumor cells and lymphocytes).

The metrics chosen correspond to multiple frameworks (a point-process analysis framework, an areal-process analysis framework and a geostatistical framework). In particular embodiments, for each subject, a label can be defined to indicate whether the indicated feature (e.g., microsatellite stability) was observed. An L1-regularized logistic-regression model can be trained and tested with the paired input data and labels, using repeated nested 5-fold cross-validation with lasso. Specifically, for each of 5 data folds, the model can be trained on the remaining 4 folds and tested on the remaining fold to calculate an area under an ROC.

Figure 11:
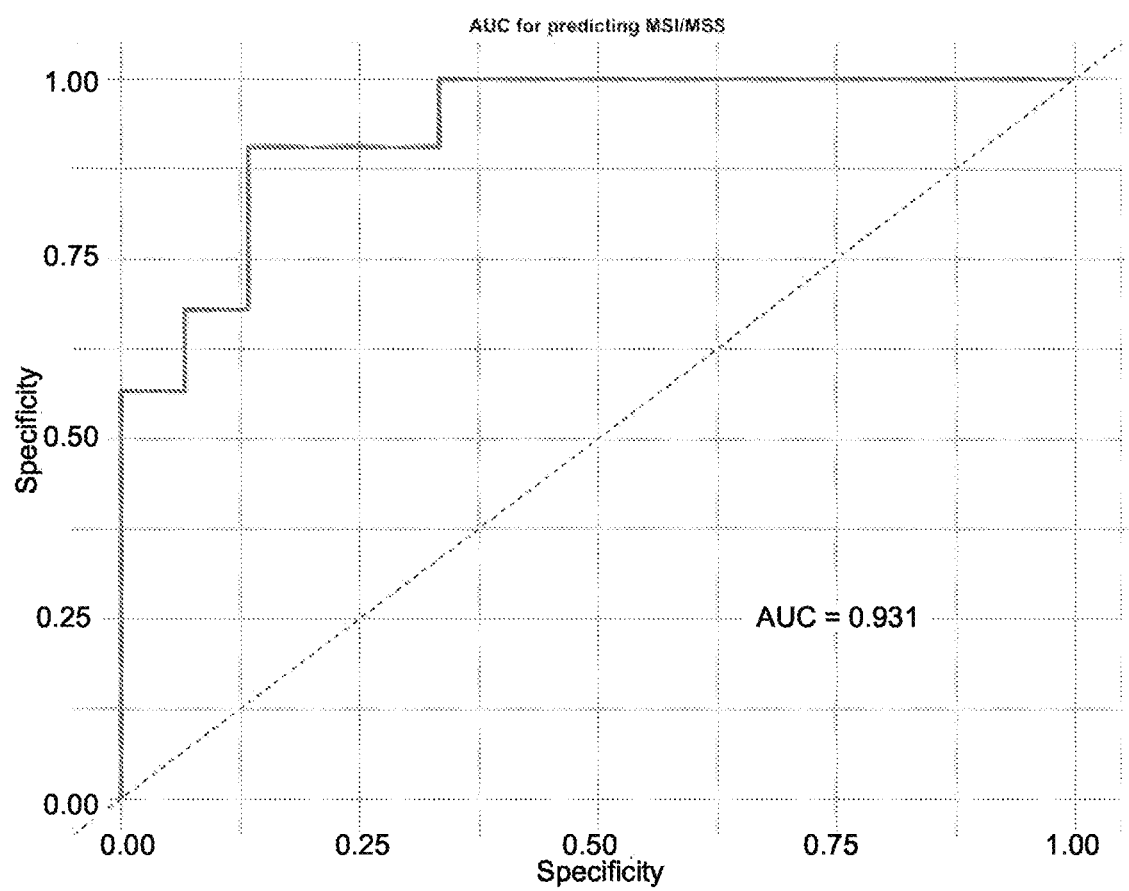
FIG. 11 illustrates a receiver-operating curve characterizing the performance of a trained logistic-regression model to predict occurrence of microsatellite instability based on processing of digital pathology images according to some embodiments.

FIG. 11 shows an exemplary median receiver-operating curve (ROC) generated using 5-fold cross-validation. In the described example, the median area under the ROC generated using the validation set was 0.931. The 95% confidence interval was (0.88, 0.96). The variables from the input data set that were most frequently picked by the L1-regularized logistic-regression model can be identified to indicate which metrics were considered most predictive of the specified feature of the subject condition. For example, the most frequently picked metrics can be the area under the curve of the pair correlation function and hot-spot ratio calculated using Getis-Ord local statistics, indicating that these metrics are most predictive of microsatellite instability. Processing digital pathology images can serve as a reliable substitute for certain onerous and expensive testing. For example, in the example discussed herein, the digital pathology image processing system can indicate that processing can mirror or exceed DNA analysis in terms of determining whether a given subject's tumor exhibits microsatellite instability. Using the image-based approach according to the subject matter of this disclosure can thus remove the need to collect additional biopsy sample from a subject to collect DNA, and time and expense to perform DNA analysis can further be saved.

In particular embodiments, for each of a first subject and a second subject, a digital pathology image of a stained biopsy section is accessed. Depictions of a first type of biological object and depictions of a second type of biological object (e.g., lymphocytes and tumor-cells) can be detected within each image according to the techniques described herein. An input vector, as described herein can be generated for each subject. The input vectors can be separately processed by the logistic-regression model trained, as described herein.

The model outputs a first label in response to processing the input vector associated with the first subject. The first label can correspond, for example, to a prediction that the first subject's cancer exhibits microsatellite instability.

The model outputs a second label in response to processing the input vector associated with the second subject. The second label can correspond, for example, to a prediction that the second subject's cancer does not exhibit microsatellite stability.

Each of the first label and the second label can be (separately) processed in accordance with a treatment-recommendation rule. The rule can be configured to recommend certain treatments, e.g., an immunotherapy (or immune-checkpoint therapy) treatment, upon detecting certain features of subject conditions, e.g., detecting microsatellite instability, or to recommend against use of other treatments, e.g., immunotherapy (or immune-checkpoint therapy) treatment, upon detecting certain features of subject conditions. Results from the rule processing can indicate, for example, that an immunotherapy treatment is recommended for the first subject but not for the second subject.

In particular embodiments, digital pathology images can depict a tumor microenvironment that includes spatial structure of tissue components and their microenvironment interactions. The microenvironment can be highly influential with regard to tissue formation, homeostasis, regeneration processes, and immune response, etc.

Non-small-cell lung cancer (NSCLC) is a major global health problem and is the leading cause of cancer-related mortality worldwide. Despite the wide range of treatment options available, for patients with metastatic (EGFR- and ALK-negative/unknown) NSCLC, chemotherapy is still a mainstay of treatment. However, immune checkpoint inhibitors are revolutionizing the treatment algorithm for this subpopulation.

Spatial statistics (e.g., spatial distribution metrics) can be calculated using digital pathology images to determine the extent to which the statistics were predictive of overall survival to various treatments. Arms of a clinical study can be established to test the efficacy of the various treatments. An exemplary clinical trial was performed to evaluate the safety and efficacy of Atezolizumab (an engineered anti-programmed death-ligand 1 [PD-L1] antibody) in combination with Carboplatin and Paclitaxel (e.g., "Arm ACP") with or without Bevacizumab (e.g., "Arm ABCP") compared with treatment with Carboplatin and Paclitaxel and Bevacizumab (e.g., "Arm CPB") in chemotherapy-naive participants with Stage IV non-squamous NSCLC. Participants were randomized in a 1:1:1 ratio to Arm ACP, Arm ACPB, or Arm CPB, the control arm.

Tissue samples were collected at baseline. For each subject in each treatment arm, digital pathology (e.g., H&E pathology) images can be captured of baseline tissue samples. H&E stained slides of tissue sample were scanned and digitalized to generate digital pathology images of a type described herein. Regions relating to one or more depictions of biological objects on the digital pathology images (also referred to as whole slide images or "WSI") were annotated. Depictions of particular types of biological objects, including tumor cells, immune cells, and other stromal cells, were detected. Location coordinates for each depiction of each type of biological object were generated, e.g., according to the subject matter disclosed herein. In one example, while investigating the efficacy of the different study arms, the focus can be, for example, on lymphocytes and tumor cells to investigate the immune infiltrate, tumor resource distribution, and cell-cell interaction.

For each image, a wide variety of spatial features can be derived based on detected biological object conditions and/or their respective associated locations based on the spatial statistics (e.g., spatial distribution metrics) algorithms discussed herein including for example, spatial point process methods (e.g., Ripley's K function features, G function features, Pair correlation function features, Mark correlation function features, and intra-tumor lymphocyte ratio), spatial lattice process methods (e.g., Morisita-Horn Index, Jaccard index, Sorensen index, Moran's I, Geary's C, and Getis-Ord Hotspot), and geostatistics process methods (ordinary Kriging features, indicator Kriging features).

Additionally, the purposes of clinical study, an outcome variable can be identified, for example overall survival of subjects.

In general, an analysis performed in this example was conducted to determine whether a difference in the overall survival between an ACP cohort and BCP cohort would become more pronounced when only a portion of each cohort is considered—the portion being selected as individuals predicted to have longer survival relative to other subjects in the cohort. The prediction can be based on, for example, one or more of the spatial-distribution metrics discussed herein generated for digital pathology images of samples taken from the subjects. In particular embodiments, a first analysis included comparing the intent-to-treat population of ACP versus BCP with the overall survival. A second analysis included using a model-based predictive enrichment strategy to investigate the association between the derived spatial features and overall survival (OS). The predictive enrichment for clinical studies, including NSCLC clinical studies, identifies a responder subpopulation $\Omega$ in the total patient population $\Omega_0$ with a larger than average response to treatment measured, for example, by Odds Ratio (OR), Relative Risk (RR), or Hazard Ratio (HR). Focusing on this subpopulation has the advantage to increase the study efficiency or feasibility, and to enhance benefit-risk relationship for the subjects in the subset compared to the overall population. One possible enrichment strategy is open-label single-arm trial followed by randomization. In this design, the investigational treatment is given to all subjects, and the responders identified by prespecified criteria (e.g., study endpoint or a biomarker) are randomized into a placebo-controlled trial.

A model-based methodology can be used, for example, to address the predictive enrichment question. In particular, an enrichment model can be developed retrospectively where the clinical study has already been conducted. To develop the enrichment model retrospectively, data can be divided into training, validation, and test set by 60:20:20 in each arm (e.g., according to the subject matter disclosed herein). The training set in the treatment arm can be used, for example, to simulate the open-label pre-randomization stage in the empirical design. A Cox model or an Objective Response model with spatial-statistical features as input can be fitted with $L_1$ or $L_2$ regularization on the training set of a treatment arm, for example ACP. The predicted risk score from fitted Cox model or the predicted response probability can be used as a response score $\hat{S}$, and the responder criterion can be specified in the form of subset condition:

$$\Omega = \{x | \hat{S}(x) \le S_q\}$$

where $S_q$ indicates a q-quantile of the response score and x represents subject-level covariates characterized by the feature vector. The validation set of combined treatment and control patients can be used to simulate a recruited subject group prior to randomization. To implement the subset condition, the quantile can be calculated for treatment and control arm in validation set respectively but with the same q, and the subset is taken for treatment and control in validation set respectively using the above equation. The subset $\hat{\Omega}$ in this example can be estimated by evaluating q using either log rank test on survival data or permutation test on Objective Response data towards the most significant difference between the treatment and control both being subset to the responder subgroup in the validation set. The subset $\hat{\Omega}$ can also be estimated using a pre-specific response threshold q. The enrichment condition with the threshold $\hat{q}$ becomes $\hat{S}(x) \leq S_{\hat{q}}$, and can then evaluated with the same method in the test set upon Hazard Ratio or Odds Ratio.

In embodiments with limited sample size, a nested Monte Carlo Cross Validation (nMCCV) can be used to evaluate the model performance. The same enrichment procedure can be repeated B times by randomly splitting with the same proportion between training, validation and test sets, to produce an ensemble of score function and threshold $\{(\hat{S}_b, \hat{q}_b)\}_{b=1}^B$. For the i-th subject, the ensembled responder status can be evaluated by averaging, among the repetitions where i is randomized to test set, the membership of responder group for i, and thresholding by 0.5. Hazard ratio or Odds ratio together with a 95% confidence interval and p-value can be calculated on the aggregated test subjects.

Figure 12:
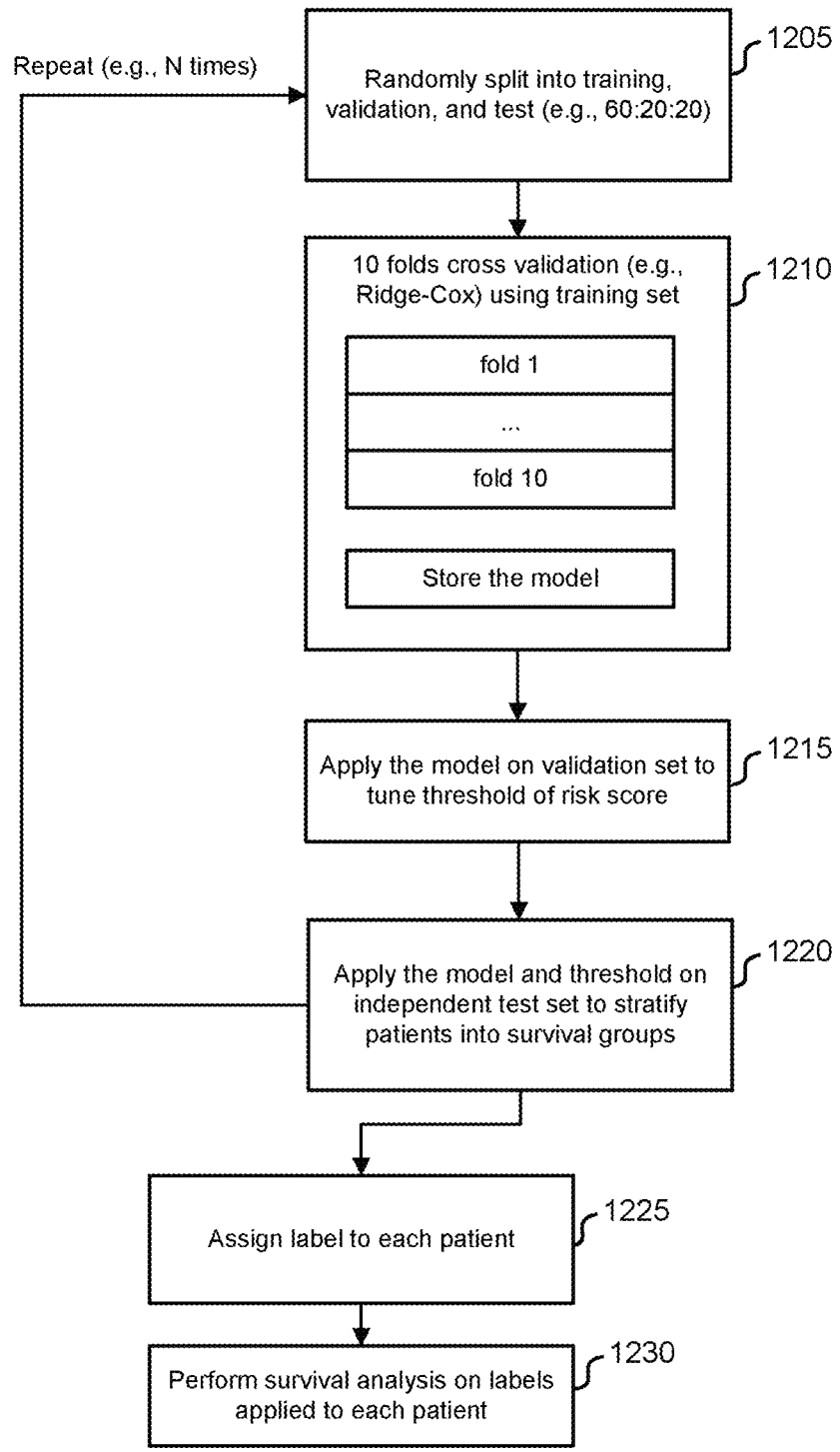
FIG. 12 illustrates a process for assigning a predicted outcome label to each subject in a study cohort using a nested Monte Carlo Cross Validation modeling strategy.

The overall workflow for predictive analysis is summarized in the flowchart of FIG. 12. More specifically, in order to assign each subject in the study cohort a label, a nested Monte Carlo Cross-Validation (nMCCV) modeling strategy was used to overcome overfitting.

Specifically, for each subject, at block 1205, a data set can be split into training, validation, and test data portions in 60:20:20 proportions. At block 1210, 10-fold cross-validation Ridge-Cox (L2 regularized Cox model) can be performed using the training set to produce 10 models (having a same model architecture). A particular model across the 10 produced models can be selected based on the 10-fold training data and stored. At block 1215, the particular model can then be applied on the validation set to tune a specified variable. For example, the variable can identify a threshold for a risk score. At block 1220, the threshold and particular model can then be applied to the independent test set to generate a vote for the subject predicting whether the subject is stratified into a longer or shorter survival group. The data splitting, training, cut-off identification and vote generation (blocks 1205-1220) can be repeated N (e.g., =1000) times. At block 1225, the subject is then assigned to one of a longer survival group or a shorter survival group based on the votes. For example, the step at block 1225 can include assigning a subject to a longer survival group or shorter survival group by determining which group was associated with the majority of votes. At block 1230, a survival analysis can then be performed of the longer/shorter survival group subjects. It will be appreciated that similar procedures to apply a wide variety of labels to data, based on the outcomes of interest, can be applied any suitable clinical evaluation or eligibility study.

Figure 13:
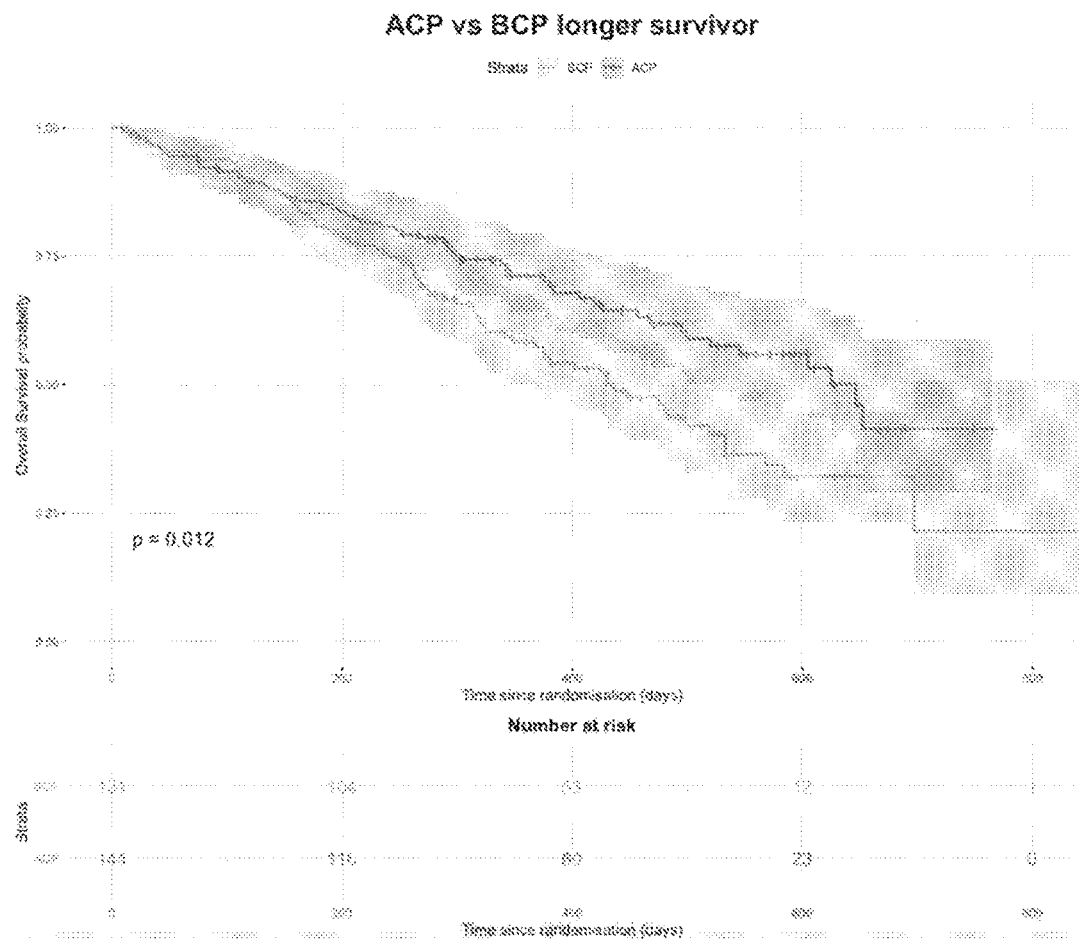
FIG. 13 shows a Kaplan-Meir plot for subjects in an analysis of two subject cohorts.

In contrast to the main findings when comparing the intent-to-treat population of ACP vs. BCP with the overall survival hazard ratio (HR) 0.85 (95% CI 0.71-1.03), the proposed approach yielded a clear separation between the identified group of ACP and the BCP cohort, HR=0.64 (95% CI 0.45-0.91; FIG. 13) of this example. Note that an overall survival hazard ratio of 1.0 indicates that survival is statistically the same across the cohorts. Thus, in this described example, the lower hazard ratio secured using the second analysis approach (during which statistics were calculated only for a portion of the cohorts predicted to have longer survival based on spatial statistics and/or spatial distribution metrics) suggests that the second analysis was better able to identify subjects for which a treatment (the ACP treatment) would be effective. Therefore, the use of spatial distribution metrics represents an improvement over previous approaches.

The comprehensive model based on spatial statistics and spatial-distribution metrics used in the analysis of this example empowered an analytical pipeline that generated system-level knowledge of, in this case, tumor microenvironment spatial heterogeneity by modeling histopathology images as spatial data. The results show that the method based on spatial statistics can stratify subjects who benefit from the Atezolizumab treatment in comparison with standard of care. This effect is not limited to the particular treatment evaluation discussed in this example. Using spatial statistics to characterize histopathology images, and other digital pathology images, can be useful in the clinical setting to predict treatment outcomes and to thus inform treatment selection.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed can be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes can be made in the function and arrangement of elements without departing from the spirit and scope as set forth in the appended claims.

Specific details are given in the following description to provide a thorough understanding of the embodiments. However, it will be understood that the embodiments can be practiced without these specific details. For example, circuits, systems, networks, processes, and other components can be shown as components in block diagram form in order not to obscure the embodiments in unnecessary detail. In other instances, well-known circuits, processes, algorithms, structures, and techniques can be shown without unnecessary detail in order to avoid obscuring the embodiments.

I claim:

1. A computer-implemented method comprising, by a digital pathology image processing system:
   accessing a digital pathology image that depicts a section of a biological sample from a subject;
   detecting, within the digital pathology image:
      a first set of biological object depictions, each of the first set of biological object depictions depicting a first individual biological object of a first type of biological object;
      a location for each of the first set of biological object depictions based on a set of pixels corresponding to a detected edge of one or more of the first set of biological object depictions;
      a second set of biological object depictions, each of the second set of biological object depictions depicting a second individual biological object of a second type of biological object; and
      a location for each of the second set of biological object depictions based on a set of pixels corresponding to a detected edge of one or more of the second set of biological object depictions;
   generating, using the locations of the first set of biological object depictions and the locations of the second set of biological object depictions, a spatial-distribution metric that characterizes locations of the first set of biological object depictions relative to the second set of biological object depictions;
   generating, using the spatial-distribution metric, a subject-level result corresponding to a predicted biological state of or a potential treatment for the subject; and
   generating a display including the subject-level result.

2. The computer-implemented method of claim 1, wherein the first type of biological object includes a first type of cell, and wherein the second type of biological object includes a second type of cell.

3. The computer-implemented method of claim 2, wherein the first type of biological object includes lymphocytes, and wherein the second type of biological object includes tumor cells.

4. The computer-implemented method of claim 1, wherein the digital pathology image depicts the biological sample from the subject after it has been treated with one or more stains, each of the one or more stains enhancing an appearance one or more of the first type of biological object or the second type of biological object.

5. The computer-implemented method of claim 1, wherein:
   detecting the location for each of the first set of biological object depictions based on the set of pixels corresponding to the detected edge of one or more of the first set of biological object depictions comprises identifying, for each first biological object depiction of the first set of biological object depictions, a first point location within the digital pathology image corresponding to the first biological object depiction;
   detecting the location for each of the second set of biological object depictions based on the set of pixels corresponding to the detected edge of one or more of the second set of biological object depictions comprises identifying, for each second biological object depiction of the one or more second biological object depictions, a second point location within the digital pathology image corresponding to the second biological object depiction; and
   generating the spatial-distribution metric comprises determining the spatial-distribution metric based on the first and second point locations.

6. The method of claim 5, wherein the first point location within the digital pathology image is selected by calculating, for the first biological object depiction, a mean point location, a centroid point location, a median point location, or a weighted point location.

7. The computer-implemented method of claim 5, wherein generating the spatial-distribution metric further comprises calculating, for each of at least some first biological object depictions of the one or more first biological object depictions and for each of at least some second biological object depictions of the one or more second biological object depictions, a distance between the first point location corresponding to the first biological object depictions and the second point location corresponding to the second biological object depictions.

8. The computer-implemented method of claim 7, wherein generating the spatial-distribution metric further comprises identifying, for each of the at least some first biological object depictions of the one or more first biological object depictions, one or more of the second biological object depictions associated with a distance between the first biological object depiction and the second biological object depiction.

9. The computer-implemented method of claim 1, wherein generating the spatial-distribution metric comprises:
   defining a spatial lattice configured to divide an area of the digital pathology image into a set of image regions;
   assigning each first biological object depiction of the first set of biological object depictions to an image region of the set of image regions;
   assigning each second biological object depiction of the one or more second biological object depictions to an image region of the set of image regions; and
   generating the spatial-distribution metric based on the image-region assignments.

10. The computer-implemented method of claim 9, wherein generating the spatial-distribution metric further comprises:
    identifying a first set of one or more image regions of the set of image regions with a first probability of including a first biological object depiction, wherein a neighboring image region has a second probability of including a first biological object depiction and the second probability is less than the first probability;
    identifying a second set of one or more image regions of the set of image regions with a third probability of including a second biological object depiction, wherein a neighboring image region has a fourth probability of including a second biological object depiction and the fourth probability is less than the second probability; and
    determining the spatial-distribution metric based further on the first set of image regions and the second set of image regions.

11. The computer implemented method of claim 10, wherein generating the spatial-distribution metric further comprises:
    identifying a third set of one or more image regions of the set of image regions with a fifth probability of including both a first biological object depiction and a set biological object depiction, wherein a neighboring image region has a sixth probability of including both a first biological object depiction and a set biological object depiction and the second probability is less than the first probability; and determining the spatial-distribution metric based further on the third set of image regions.

12. The computer-implemented method of claim 1, wherein generating, using the spatial-distribution metric, the subject-level result corresponding to the predicted biological state of or the potential treatment for the subject comprises:

comparing the spatial-distribution metric generated for the digital pathology image to a previous spatial-distribution metric generated for a previous digital pathology image; and outputting a subject-level result generated for the previous digital pathology image based on the comparison.

13. The computer-implemented method of claim 1, wherein generating the subject-level result includes:

determining a diagnosis, prognosis, treatment recommendation, or treatment eligibility evaluation for the subject based on processing the spatial-distribution metric and the first set of biological object depictions and the second set of biological object depictions using a trained machine-learning model.

14. The computer-implemented method of claim 1, wherein the spatial-distribution metric comprises:

a metric defined based on a K-nearest-neighbor analysis;
a metric defined based on Ripley's K-function;
a Morisita-Horn index;
a Moran's index;
a metric defined based on a correlation function;
a metric defined based on a hotspot/coldspot analysis; or
a metric defined based on a Kriging-based analysis.

15. The computer-implemented method of claim 1, wherein:

the spatial-distribution metric is of a first type of metric;
the computer-implemented method further comprises generating, using the first set of biological object depictions and the second set of biological object depictions, a second spatial-distribution metric that characterizes locations of the first set of biological object depictions relative to the second set of biological object depictions, wherein the second spatial-distribution metric is of a second type of metric that is different from the first type of metric; and
the subject-level result is generated further using the second spatial-distribution metric.

16. The computer-implemented method of claim 1, further comprising:

receiving user input data from a user device comprising an identifier of the subject or of the digital pathology image, wherein the digital pathology image is accessed based on the received user input data; and wherein providing the subject-level result for display comprising providing the subject-level result to the user device.

17. The computer-implemented method of claim 1, further comprising:

outputting a clinical assessment to a user device of the subject, the clinical assessment comprising a diagnosis, prognosis, treatment recommendation, or treatment eligibility evaluation for the subject.

18. A system comprising:
one or more data processors; and
a non-transitory computer readable storage medium communicatively coupled to the one or more data processors, and including instructions which, when executed by the one or more data processors, cause the one or more data processors to perform one or more operations comprising:

accessing a digital pathology image that depicts a section of a biological sample from a subject;

detecting, within the digital pathology image:

a first set of biological object depictions, each of the first set of biological object depictions depicting a first individual biological object of a first type of biological object;

a location for each of the first set of biological object depictions based on a set of pixels corresponding to a detected edge of one or more of the first set of biological object depictions;

a second set of biological object depictions, each of the second set of biological object depictions depicting a second individual biological object of a second type of biological object; and a location for each of the second set of biological object depictions based on a set of pixels corresponding to a detected edge of one or more of the second set of biological object depictions;

generating, using the locations of the first set of biological object depictions and the locations of the second set of biological object depictions, a spatial-distribution metric that characterizes locations of the first set of biological object depictions relative to the second set of biological object depictions;

generating, using the first spatial-distribution metric, a subject-level result corresponding to a predicted biological state of or a potential treatment for the subject; and generating a display including the subject-level result.

19. One or more computer-readable non-transitory storage media including instructions that, when executed by one or more data processors, cause the one or more data processors to performed operations comprising:

accessing a digital pathology image that depicts a section of a biological sample from a subject;

detecting, within the digital pathology image:

a first set of biological object depictions, each of the first set of biological object depictions depicting a first individual biological object of a first type of biological object;

a location for each of the first set of biological object depictions based on a set of pixels corresponding to a detected edge of one or more of the first set of biological object depictions;

a second set of biological object depictions, each of the second set of biological object depictions depicting a second individual biological object of a second type of biological object; and a location for each of the second set of biological object depictions based on a set of pixels corresponding to a detected edge of one or more of the second set of biological object depictions;

generating, using the locations of the first set of biological object depictions and the locations of the second set of biological object depictions, a spatial-distribution metric that characterizes locations of the first set of biological object depictions relative to the second set of biological object depictions;

generating, using the first spatial-distribution metric, a subject-level result corresponding to a predicted biological state of or a potential treatment for the subject; and generating a display including the subject-level result.

* * * * *